United States Patent
Cai et al.

(10) Patent No.: US 10,124,350 B2
(45) Date of Patent: Nov. 13, 2018

(54) HAND-HELD SHOWER HEAD CAPABLE OF MEASURING AND SUGGESTING REPLACEMENT OF FILTERING CORE HANDLE

(71) Applicants: Ying Lin Cai, Guangdong (CN); Chao Fou Hsu, Kaohsiung (TW)

(72) Inventors: Ying Lin Cai, Guangdong (CN); Chao Fou Hsu, Kaohsiung (TW)

( * ) Notice: Subject to any disclaimer, the term of this patent is extended or adjusted under 35 U.S.C. 154(b) by 153 days.

(21) Appl. No.: 15/099,934

(22) Filed: Apr. 15, 2016

(65) Prior Publication Data

US 2016/0303580 A1  Oct. 20, 2016

Related U.S. Application Data

(60) Provisional application No. 62/149,877, filed on Apr. 20, 2015.

(51) Int. Cl.

| | |
|---|---|
| *B05B 1/18* | (2006.01) |
| *B05B 12/00* | (2018.01) |
| *C02F 1/00* | (2006.01) |
| *B05B 15/40* | (2018.01) |
| *B05B 15/62* | (2018.01) |

(52) U.S. Cl.
CPC .............. *B05B 1/18* (2013.01); *B05B 12/008* (2013.01); *B05B 15/40* (2018.02); *C02F 1/003* (2013.01); *B05B 15/62* (2018.02); *C02F 2209/005* (2013.01); *C02F 2209/40* (2013.01); *C02F 2209/445* (2013.01); *C02F 2307/06* (2013.01)

(58) Field of Classification Search
CPC ......... B05B 1/18; B05B 1/185; B05B 12/004; B05B 12/006; B05B 12/008; B05B 15/008; B05B 15/40; B05B 15/62; B05B 15/63; C02F 1/003; C02F 2209/005; C02F 2209/40; C02F 2209/445; C02F 2307/06; E03C 1/0408; E03C 1/0409

USPC .................. 239/71, 74, 462, 525, 553–553.5, 239/554–568, 575

See application file for complete search history.

(56) References Cited

U.S. PATENT DOCUMENTS

| | | |
|---|---|---|
| 6,016,977 A | 1/2000 | Farley |
| 6,892,952 B2 | 5/2005 | Chang et al. |
| 7,326,334 B2 * | 2/2008 | Boyd ..................... B01D 35/04 210/419 |
| 7,468,127 B2 | 12/2008 | Hsu |

(Continued)

OTHER PUBLICATIONS

Dukane, "What is Ultrasonic Welding", Dec. 10, 2015, <https://www.dukane.com/us/PPL_whatisUPA.htm>.*

*Primary Examiner* — Alexander Valvis
*Assistant Examiner* — Cody Lieuwen
(74) *Attorney, Agent, or Firm* — Bacon & Thomas, PLLC

(57) ABSTRACT

A hand-held shower head capable of measuring and suggesting replacement of filtering core handle includes a lower shell, an upper shell, a battery mount, a signal circuit device and a water flow measuring unit containing an impeller shaft, a magnetic element and a supporter. The water flow measuring unit and impeller shaft are disposed in a lower handle filter cartridge mounting section of the lower shell while the battery mount and a battery contained therein are disposed in an upper handle filter cartridge mounting section of the upper shell, and both the lower and upper handle filter cartridge mounting sections abut the handle filter cartridge to provide an even overall weight distribution.

18 Claims, 38 Drawing Sheets

(56) References Cited

U.S. PATENT DOCUMENTS

| | | | | |
|---|---|---|---|---|
| 7,810,650 B2* | 10/2010 | Ennis | ............. | C02F 9/005 |
| | | | | 210/236 |
| 2001/0040121 A1* | 11/2001 | Giordano | ............. | B01D 17/0208 |
| | | | | 210/87 |
| 2004/0069695 A1* | 4/2004 | Isobe | ............. | B01D 35/143 |
| | | | | 210/91 |
| 2005/0205475 A1* | 9/2005 | Hsu | ............. | B01D 35/04 |
| | | | | 210/85 |
| 2008/0272203 A1* | 11/2008 | Leber | ............. | B05B 15/65 |
| | | | | 239/101 |
| 2009/0090661 A1* | 4/2009 | Tanner | ............. | C02F 1/003 |
| | | | | 210/87 |
| 2014/0042240 A1* | 2/2014 | Cai | ............. | B05B 15/008 |
| | | | | 239/71 |

* cited by examiner

HAND-HELD SHOWER HEAD CAPABLE OF MEASURING AND SUGGESTING REPLACEMENT OF FILTERING CORE HANDLE

This application claims the benefit of provisional U.S. Patent Application No. 62/149,877, filed Apr. 20, 2015, and incorporated herein by reference.

FIELD OF THE PRESENT INVENTION

The present invention relates to a hand-held shower head capable of measuring and suggesting replacement of a filtering core handle. According to a preferred embodiment, the filtering core handle includes a water flow measuring unit and impeller shaft disposed to abut a handle filter cartridge such that the shower head has a move even, less top heavy overall weight distribution than a prior handheld showerhead with filter replacing pre-alarm device.

BACKGROUND OF THE INVENTION

The inventor's U.S. Pat. No. 7,468,127, issued Jan. 6, 2005, and entitled "Hand-Held Shower Head with Filter Replacing Pre-Alarm Assembly," disclosed a first generation of a showerhead series, the most recent upgrade of which was disclosed in a family of patent applications of the inventor entitled "Hand Held Shower Head with Filter Replacing Pre-Alarm Assembly" and including Taiwan Patent Appl. No. 101129129, Mainland China Patent Appl. No. 201210425572.5, U.S. patent application Ser. No. 13/729, 063 and U.S. Patent Publication No. 2014/0042240, UK Patent Appl. No. 1308734.11308734.1, German Patent Appl. No. 102013108371.4, Japanese Patent No. 5594615, and Korean Patent No. 10-147159, The foregoing patents and pending patent applications entitled "Hand Held Shower Head with Filter Replacing Pre-Alarm Assembly" disclose a showerhead shell 100, an internal lid 70, an impeller 80, a hood 90, a detachable alerting pod 200 and a signal circuit device 300, in which the showerhead shell 100 is a plastic hollow casing extruded into unitary piece having a shelf 103 that encompasses an obverse side 101 with a set of peripheral male threads 120 and a reverse side 102 to form an integral body. The showerhead shell 100 has a handle butt 104 having a tapered periphery and from which a tube having threads 106 extends to connect with corresponding threads of a handle filter cartridge 60. A hollow water entry 105 extends through the handle butt 104, and a receptacle 107 is formed in an interior of the obverse side 101. A water exit bore base 109 and an impeller well 108 with an impeller hub notch 110 extend inwardly into an interior bottom surface of the receptacle 107, and a water inlet channel 111 is formed to communicate between the hollow water entry 105 in the handle butt 104 and an adjacent side of the impeller well 108, while a water outlet channel 112 is formed to communicate between the water exit bore base 109 and the other side of the impeller well 108 (as indicated by the dotted line portion shown in FIG. 3). A round recess socket 113 extends inwardly into the reverse side 102 of the shelf 103 to receive a detachable alerting pod 200 such that a terminal latching notch 114 is created in the distal internal wall (shown on the left in the main and enlarged views of FIG. 2) of the recess socket 113 while a snap latching arm 115 extends from the proximal internal wall (shown on the right side in FIG. 2) of the recess socket 113 in addition, a finger guiding groove 116 extends into the top surface of the handle butt 104 abutting the rim of the reverse side 102.

An internal lid 70, which is a planiform disk tightly attached on the bottom side of the receptacle 107 in the showerhead shell 100, has an inward surface 71 facing toward the obverse side 101 of the showerhead shell 100, an impeller hub notch 72 formed therein to correspond with the impeller hub notch 110 of the impeller well 108, a water outlet 73 formed therein to correspond with the water exit bore base 109 of the receptacle 107 in the showerhead shell 100, and a plurality of screw holes 74 extending through the internal lid 70 at a periphery thereof such that the screw holes 74 spread around the impeller hub notch 72 and water outlet 73.

An impeller 80, which is a cylindrical profile body with plural radially extending curved vanes, has two central protruding hubs 81 coaxially disposed at a respective top side and bottom side thereof, and a magnetic element 82 embedded in the top cut of one vane such that the impeller 80 is freely rotatable in the impeller well 108 by means of the two central protruding hubs 81 being mated with the impeller hub notch 110 of the impeller well 108 and the impeller hub notch 72 of the internal lid 70 respectively (as shown in FIG. 14).

A hood 90, which is a plastic disk extruded into a unitary piece, is provided with female threads 91 that extend around a bottom rim of the hood and a plurality of water spray holes 92 spread over the surface thereof so that the female threads 91 can mate with the male threads 120 on the obverse side 101 of the showerhead shell 100 by screwing engagement, so that the water spray holes 92 enable the water in the receptacle 107 on the obverse side 101 of the showerhead shell 100 to jet out.

The alerting pod 200, which is a plastic capsule made by high frequency or ultrasonic fusion of a plastic transparent lid 201 and a plastic mounting cavity 202 to form a hermetically watertight integral body to be embedded into the round recess socket 113 of the reverse side 102 of the showerhead shell 100 for accommodating the signal circuit device 300 therein (as shown in FIGS. 10 and 11). Alerting pod 200 has a terminal latching projection 203 created on a heading rim of the alerting pod (left in FIGS. 1 and 8) while a snap latching notch 204 is formed on the rear rim of the alerting pod (right in FIG. 8), and two passive recharging electrodes 205 are firmly inset in an internal bottom wall of the mounting cavity 202, with each individual end of the two passive recharging electrodes 205 protruding out of the mounting cavity 202 (as shown on the lower side in the enlarged view in FIG. 8).

The signal circuit device 300, which is contained in the alerting pod 200, includes a microprocessor 301, an LCD display circuit 302 electrically connected to the microprocessor 301 with its location near the transparent lid 201, a rechargeable battery 303 electrically connected to the microprocessor 301, and a magnetic reed switch 304 securely inset on the internal bottom side of the mounting cavity 202 (as shown in FIG. 7) such that the rechargeable battery 303 is connected with the passive recharging electrode 205 of the alerting pod 200 via a pair of wires W (as shown on the lower side of the enlarged view in FIG. 8).

Assembly steps for the shower head of FIGS. 1 to 8 are illustrated in FIGS. 9 to 16, as follows:

a. Align the protruding hub 81 (upper side in FIG. 9) of the impeller 80 having magnetic element 82 in one vane with the impeller hub notch 110 of the impeller well 108 in the obverse side 101 of the showerhead shell 100, and then put the protruding hub 81 into the impeller hub notch 110 so that the magnetic element 82 of the impeller 80 faces toward the recess socket 113 of the showerhead shell 100 (as shown in FIG. 9).

b. Attach the inward surface 71 of the internal lid 70 against the top surface of the receptacle 107 in the showerhead shell 100 so that the impeller hub notch 72 of the internal lid 70 sleeves over the other protruding hub 81 of the impeller 80 (lower side in FIG. 10), drive every self-tapping screw S into the internal bottom wall of the receptacle 107 via corresponding screw hole 74 of the internal lid 70 respectively so that the internal lid 70 is closely attached with the top surface of the receptacle 107 to allow the impeller 80 to freely rotate in the impeller well 108 (as shown in FIG. 11).

c. Mate the female threads 91 on the hood 90 with the male threads 120 on the obverse side 101 of the showerhead shell 100 by screwing engagement to complete the assembly for the obverse side 101 of the showerhead shell 100 (as shown in FIG. 12).

d. Align and mate the terminal latching projection 203 in the mounting cavity 202 of the alerting pod 200 with the terminal latching notch 114 in the recess socket 113 of the reverse side 102 of the showerhead shell 100 (as shown in FIG. 13 and in the left upper enlarged view of FIG. 14) so that the bottom side of the snap latching notch 204 in the mounting cavity 202 will contact with the top side of the snap latching projection 115 in the recess socket 113 (right side of the upper enlarged view shown in FIG. 14). Then, thoroughly latch the snap latching notch 204 in the mounting cavity 202 with the snap latching projection 115 of the recess socket 113 by forcibly applying downward force F1 over the transparent lid 201 (enlarged view shown in FIG. 15) so that the terminal latching projection 203 in the mounting cavity 202 also fully latches with the terminal latching notch 114 in the recess socket 113 simultaneously (enlarged view shown in FIG. 16) to complete the assembly for the alerting pod 200 and showerhead shell 100. Thus, the overall assembly steps in the shower head of FIGS. 1 to 8 are finished.

For operation of the shower head of FIGS. 1 to 8, please further refer to FIGS. 17 to 19. Prior to operating the shower head, first screw the handle filter cartridge 60 with the tubular threads 106 on the handle butt 104 of the showerhead shell 100, and then connect a detachable water pipe P to the handle filter cartridge 60 (as shown in FIG. 17). Once the shower head is hooked up, the tap water enters into the impeller well 108 sequentially via the handle filter cartridge 60, the water entry 105 in the handle butt 104, and the water inlet channel 111, to drive the impeller 80 rotate. Then, the tap water in the impeller well 108 flows out of the water outlet 73 in the internal lid 70 sequentially via the water outlet channel 112 and the water exit bore base 109. Finally, the tap water is jetted out of the water spray holes 92 in the hood 90 (as shown in FIGS. 18 and 19). For each rotation of the impeller 80 driven by the running water, the magnetic element 82 thereof simultaneously switches the magnetic reed switch 304 in the alerting pod 200 one time to induce a switching signal, which is relayed to the microprocessor 301 in the signal circuit device 300 for being processed to generate accumulation data at certain preset intervals for further transmission to the LCD display circuit 302 for displaying a related quantity of water flow thereon in accordance with following formula:

quantity of water flow(Q)=cross sectional area(A) times flow velocity(V)

The foregoing quantity of water flow (Q) shown in the LCD display circuit 302 is the accumulated quantity of water that has flowed through the handle filter cartridge 60, which relates to the total quantity of water flow used during the overall service life of the handle filter cartridge 60. Moreover, the foregoing quantity of water flow (Q) is pre-stored in the microprocessor 301. Thereby, a user of the shower head can get real time statistical data of the total filtered water quantity that has flowed through handle filter cartridge 60 by simply looking at the LCD display circuit 302 via the transparent lid 201 of the alerting pod 200. Once the total filtered water quantity that has flowed through handle filter cartridge 60 reaches (or nearly reaches) a predetermined critical value for the rated service life time of the specific handle filter cartridge 60, the microprocessor 301 will send an alerting signal with current data of the total filtered water quantity to the LCD display circuit 302 for reminding the user that it is time to replace the handle filter cartridge 60 in order to ensure good quality of the handle filter cartridge 60 and the water filtered thereby. Therefore, the user can avoid the harmful consequences to health caused by unclean water, which occurs as a result of missing the replacement time and continuing to use the ineffective handle filter cartridge 60.

For replacing or recharging the handle filter cartridge 60, please further refer to FIGS. 20 to 25. The hand held shower head with filter replacing pre-alarm device of shown in FIGS. 20 TO 25 further includes a battery recharging mount 400, which includes a battery recharging cavity 401 with a pair of active recharging electrodes 402 to securely contact the corresponding pair of protruding ends of the passive recharging electrodes 205 in the mounting cavity 202 of the alerting pod 200, for performing a recharging operation on the rechargeable battery 303 in the alerting pod 200. The profile of the battery recharging cavity 401 is arranged to resemble, but is slightly bigger than, the profile of the mounting cavity 202 in the alerting pod 200 to adequately accommodate the mounting cavity 202 therein for performing the recharging operation on the rechargeable battery in the alerting pod (as shown in FIGS. 24 and 25).

The power of the rechargeable battery 303 in the alerting pod 200 might run out when the handle filter cartridge 60 has been replaced several times. In that event, to replace or recharge the handle filter cartridge 60, first lift the marginal edge of the transparent lid 201 in the alerting pod 200 by hooking one finger along the finger guiding groove 116 in the reverse side 102 of the showerhead shell 100 (as shown in FIG. 20), and then applying an upward force F2 on the mounting cavity 202 (as shown in FIG. 21) until the snap latching notch 204 of the alerting pod 200 releases the snap latching projection 115 in the recess socket 113 of the showerhead shell 100 (as shown on the right upper side of the enlarged view in FIG. 21). Second, continuously apply an upward force F2 on the mounting cavity 202, the entire alerting pod 200 will fully detach from the recess socket 113 in the reverse side 102 of the showerhead shell 100 (as shown in FIGS. 22 and 23). Finally, insert the detached alerting pod 200 into the battery recharging cavity 401 of the battery recharging mount 400, at which time the rechargeable battery 303 in the alerting pod 200 will be properly recharged (as shown in FIGS. 24 and 25).

The prior art handheld showerhead with filter-replacement pre-alarm device does achieve the expected effects after having been practically tested many times. However, some issues remain, such as uneven top-heavy weight distribution, accelerated aging fatigue, and unnecessary purchase waste, as described below.

1. Uneven Top-Heavy Weight Distribution:

Please refer to FIGS. 1, 7, 17 and 18. In the prior art handheld showerhead with filter replacing pre-alarm device shown therein, some components such as rechargeable battery 303 and magnetic reed switch 304 with related parts are inserted into the alerting pod 200 of the showerhead shell 100, while some components such as impeller 80 and internal lid 70 with related parts are inserted into the impeller well 108 of the showerhead shell 100 so that the bulky showerhead shell 100 becomes heavier at the top than the slender handle of the handle filter cartridge 60 at the bottom. On the other hand, in the conventional market-available handheld shower head with built-in filter but not pre-alarm device, there is no such disadvantage that the bulky showerhead shell 100 is heavier at the top than the slender handle of the handle filter cartridge 60 at the bottom. Accordingly, the showerhead set with the pre-alarm device can become a heavy burden for younger or older users, causing their arms to ache when using the showerhead set. Moreover, the top-heavy showerhead set can easily fall to the floor during a shower due to the uneven weight distribution. Consequently, the components in the showerhead set not only may have a shortened service life, but can also quickly malfunction with respect to the water quantity measurement and pre-alarm functions.

2. Accelerated Aging Fatigue:

Please refer to FIGS. 22 to 25. To carry out recharging of the rechargeable battery 303 in the prior art hand held shower head with filter-replacement pre-alarm device, the alerting pod 200 must be taken off from the round docking socket 113 of the showerhead shell 100 and reinserted into the round recess socket 113 of the showerhead shell 100. By frequently repeating such a recharging operation, damage to the snap latching projection 115 in the round recess socket 113 of the showerhead shell 100 will be hastened by aging fatigue. Consequently, the round recess socket 113 of the showerhead shell 100 will not have a shortened service life, but the user will be obliged to replace the integral showerhead shell 100 prematurely.

3. Unnecessary Purchase Waste:

Please refer to FIGS. 8 and 24. If the user wants to recharge the rechargeable battery 303 in the prior art hand held shower head with filter-replacement pre-alarm device, the rechargeable battery 303 must be taken off from the alerting pod 200 of the showerhead shell 100 and reinserted into the battery recharging cavity 401 of the battery recharging mount 400 so that the active recharging electrode 402 can electrically connect with the passive recharging electrode 205 of the mounting cavity 202. As a result, both the active recharging electrode 402 and passive recharging electrode 205 will inevitably rust because of exposure to ambient moisture, so that a bad electrical connection between active recharging electrode 402 and passive recharging electrode 205 will happen sooner or later. The bad electrical connection between active recharging electrode 402 and passive recharging electrode 205 will not only shorten the service life but also oblige the user to prematurely replace the integral showerhead shell 100.

All of the above-described drawbacks aforesaid are harmful to the promotion of the prior art handheld showerhead with filter-replacement pre-alarm device because those drawbacks not only cause extra expense in that the user must frequently replace the filter cartridge, but also reduce motivation for the user to continuously use the product in the first place. In addressing those issues, the inventor of the present invention has diligently researched and developed a new contrivance to overcome the foregoing issues, resulting the present invention.

SUMMARY OF THE INVENTION

According to a preferred embodiment of the present invention, the problem of unequal weight distribution in a hand-held shower head capable of measuring and suggesting replacement of a filtering core handle is addressed by providing a showerhead with an integral lower shell, upper shell and handle containing a handle filter cartridge, an integral battery mount and battery lid with an embedded button-shaped battery, a signal circuit device, a transparent cover, a spray hood, as well as a water flow measuring unit containing an impeller shaft in axial flow mode, an inducting magnet and a supporter in axial flow mode. The water flow measuring unit and impeller shaft are disposed in a lower handle filter cartridge mounting section of the showerhead lower shell while the battery mount and button-shaped battery are disposed in an upper handle filter cartridge mounting section of the showerhead upper shell, and both the lower and upper handle filter cartridge mounting sections abut the handle filter cartridge such that the overall weight distribution of the showerhead is more even than that of the prior art handheld showerhead with filter-replacement pre-alarm device. Accordingly, the issue of uneven top-heavy weight distribution and resulting harmful effects incurred in the prior art handheld showerhead with filter-replacement pre-alarm device are all eliminated.

The problem of cumbersome battery replacement is also solved, in a preferred embodiment of the present invention, providing a battery lid that can be taken off the battery mount during replacement of a button-shaped battery by simply inserting a coin into the rotatable notch of the battery lid, and turn the battery lid to let the integral battery lid together with button-shaped battery be taken out of the battery mount of the showerhead upper shell, the reverse steps being subsequently performed upon replacement of the used battery by a new button-shaped battery. As a result, some of the drawbacks incurred during recharging procedures in the prior art, which result from repeated detaching of the alerting pod from the groove base in the back side of the showerhead shell and reinserting the alerting pod back into the groove base in the back side of the showerhead shell, can be eliminated.

DETAILED DESCRIPTION OF THE PREFERRED EMBODIMENTS

Figure 1:
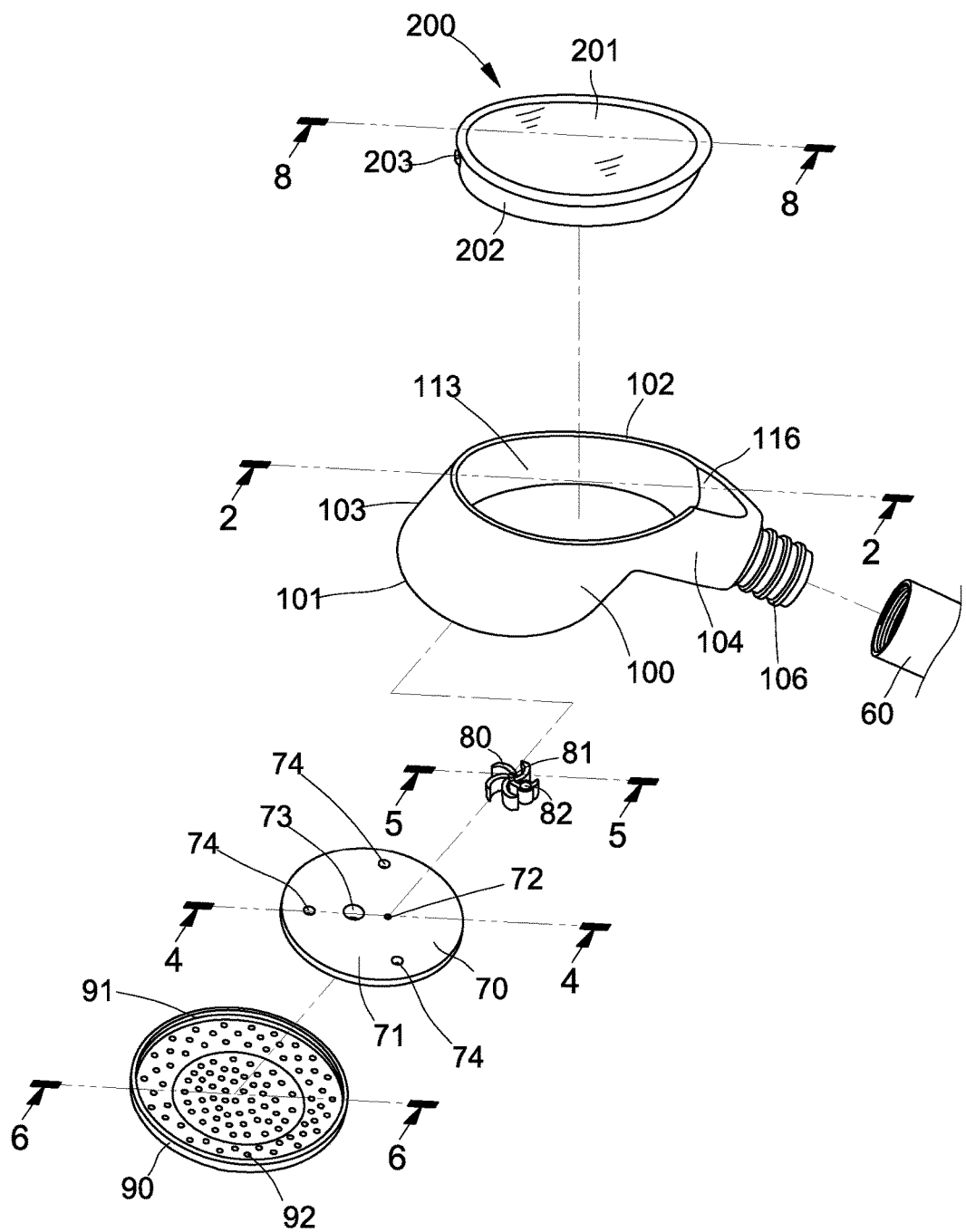
FIG. 1 is an exploded cross sectional view of a conventional hand held shower head with filter-replacement pre-alarm assembly.
Figure 2:
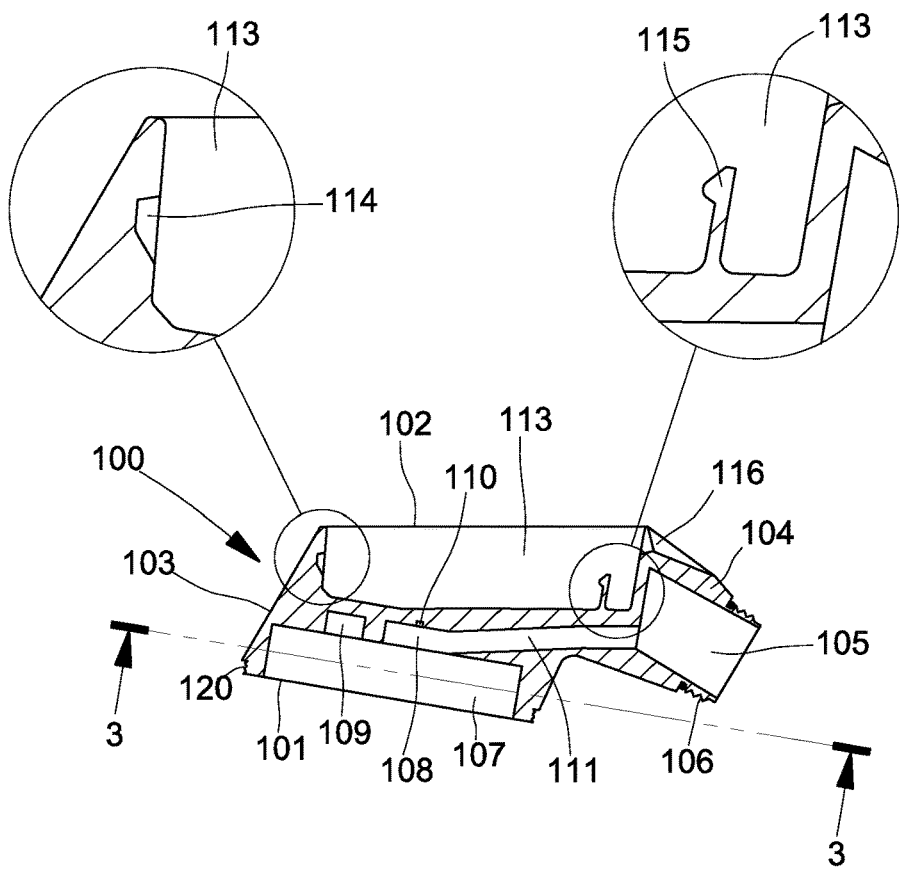
FIG. 2 is a cross sectional view taken against the section line 2-2 from previous FIG. 1.
Figure 3:
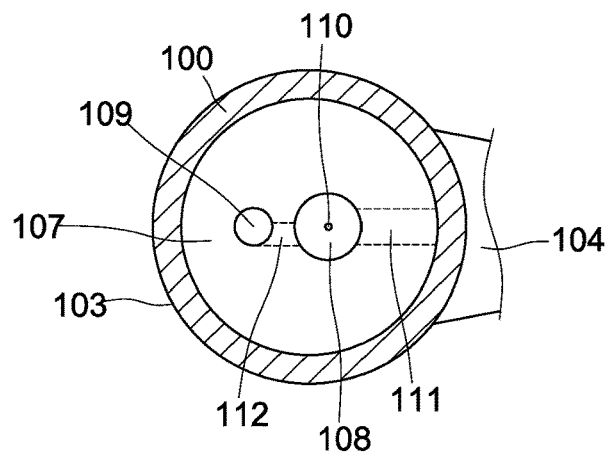
FIG. 3 is a cross sectional view taken against the section line 3-3 from previous FIG. 2.
Figure 4:
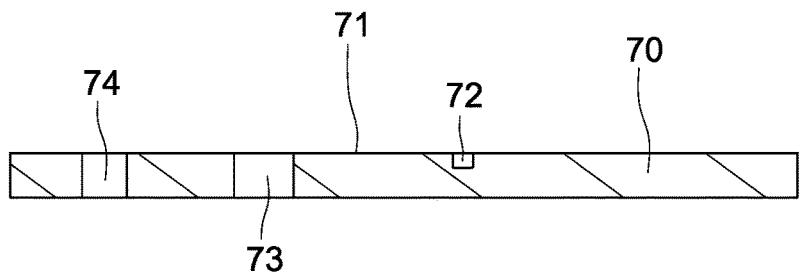
FIG. 4 is a cross sectional view taken against the section line 4-4 from previous FIG. 1.
Figure 5:
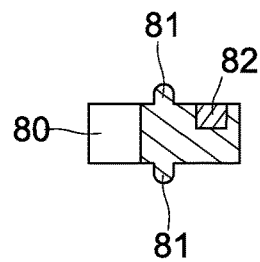
FIG. 5 is a cross sectional view taken against the section line 5-5 from previous FIG. 1.
Figure 6:
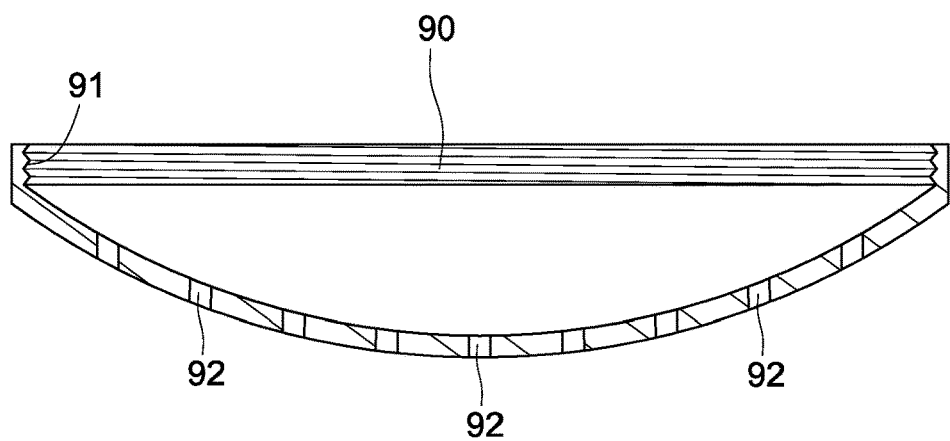
FIG. 6 is a cross sectional view taken against the section line 6-6 from previous FIG. 1.
Figure 7:
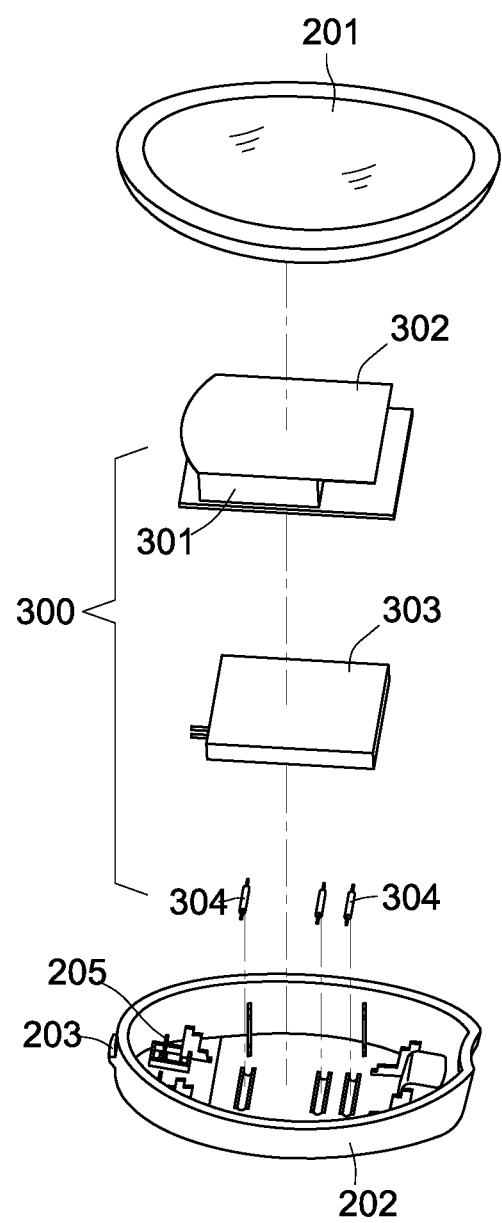
FIG. 7 is a perspective exploded view for an alerting pod in the conventional hand held shower head with filter replacing pre-alarm assembly.
Figure 8:
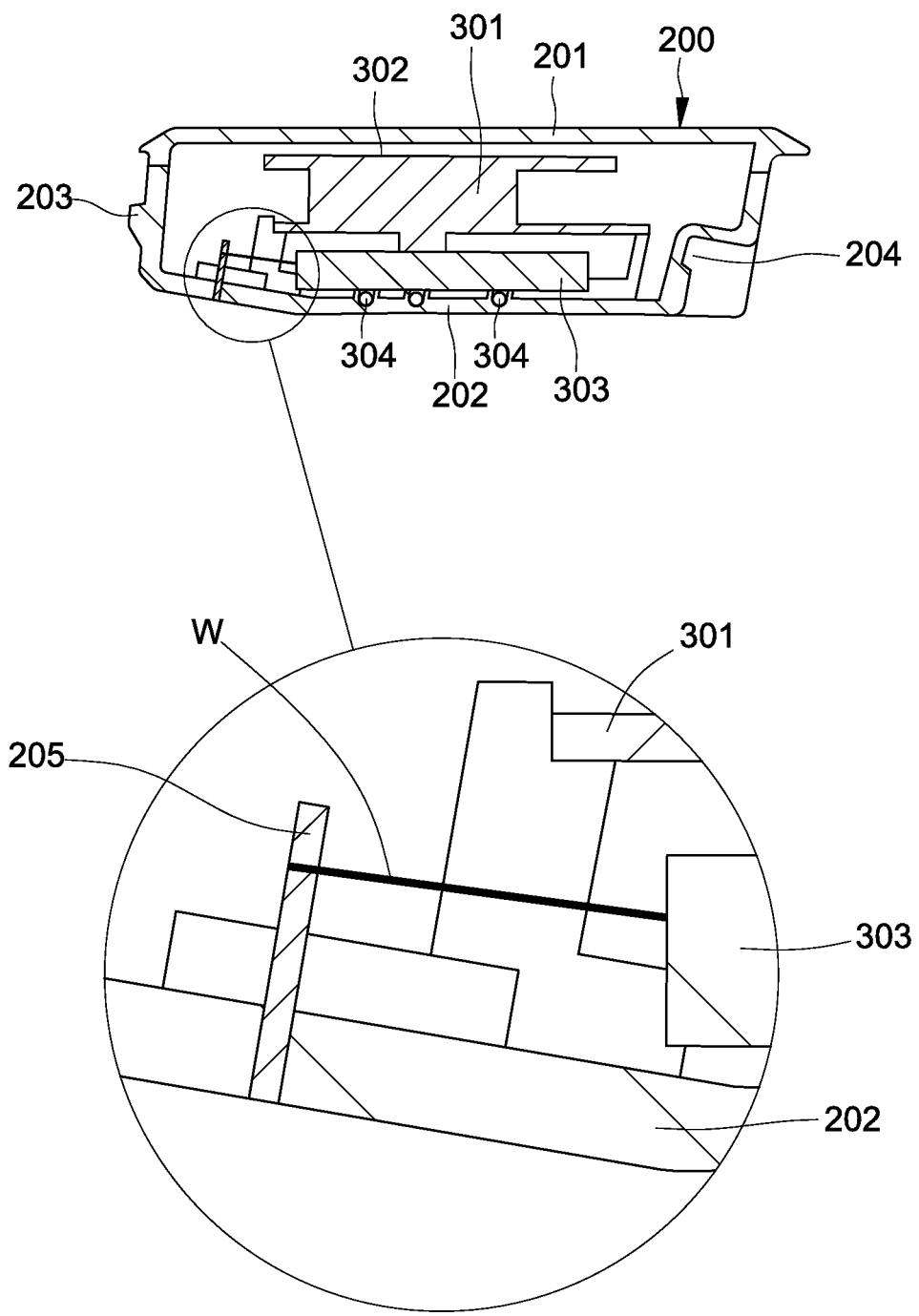
FIG. 8 is a cross sectional view taken against the section line of 8-8 from previous FIG. 1.
Figure 9:
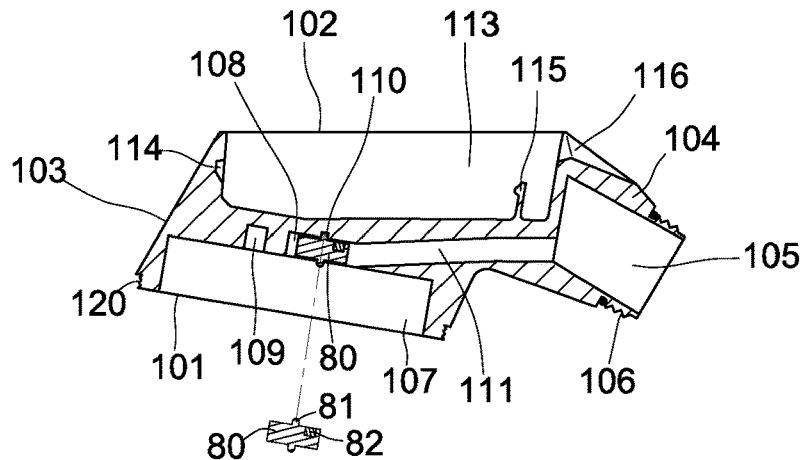
FIG. 9 is a first assembly illustrating view of the conventional hand held shower head with filter replacing pre-alarm assembly.
Figure 10:
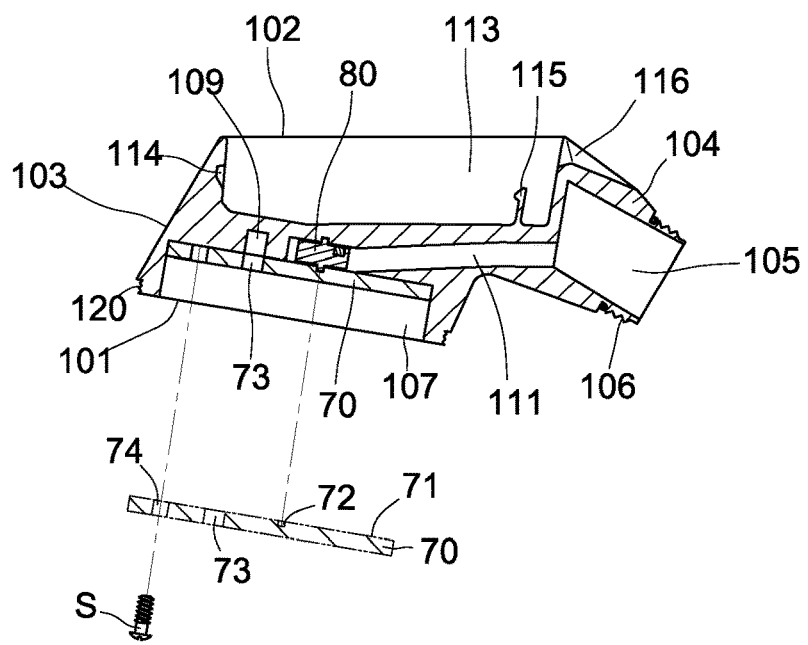
FIG. 10 is a second assembly illustrating view of the conventional hand held shower head with filter replacing pre-alarm assembly.
Figure 11:
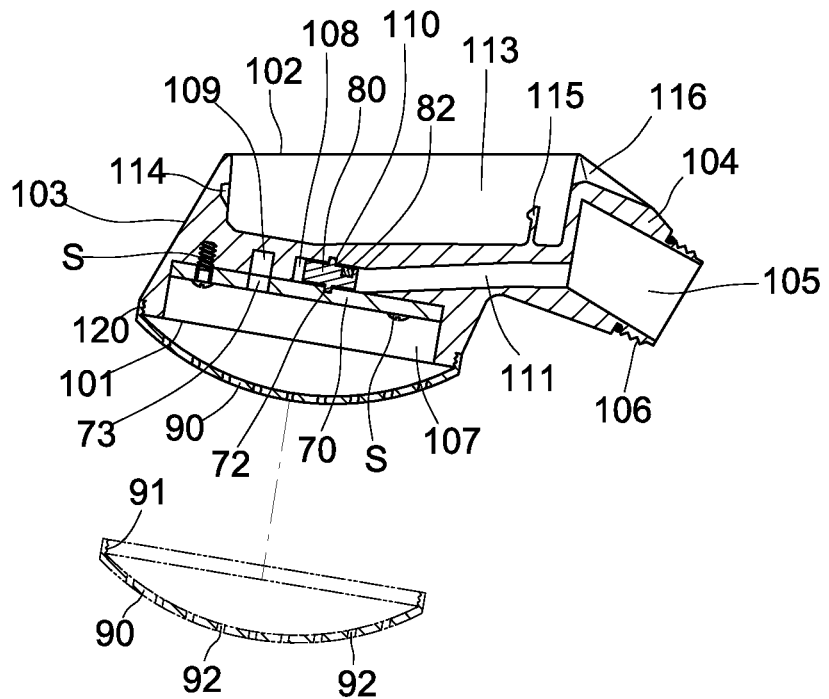
FIG. 11 is a third assembly illustrating view of the conventional hand held shower head with filter replacing pre-alarm assembly.
Figure 12:
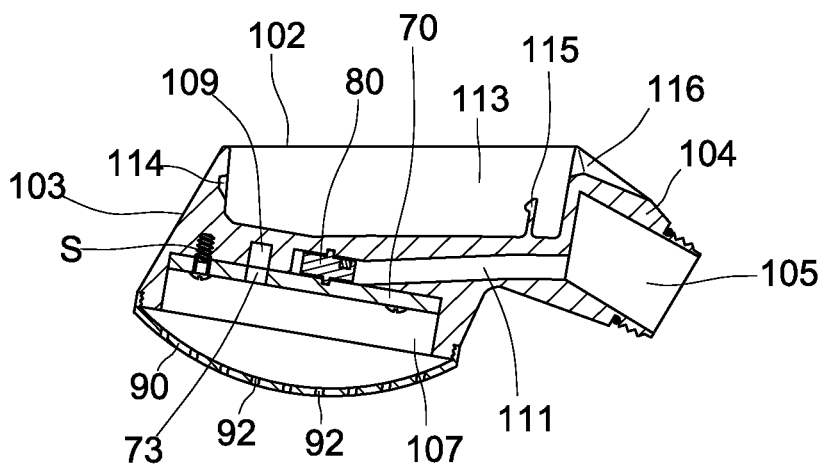
FIG. 12 is a fourth assembly illustrating view of the conventional hand held shower head with filter replacing pre-alarm assembly.
Figure 13:
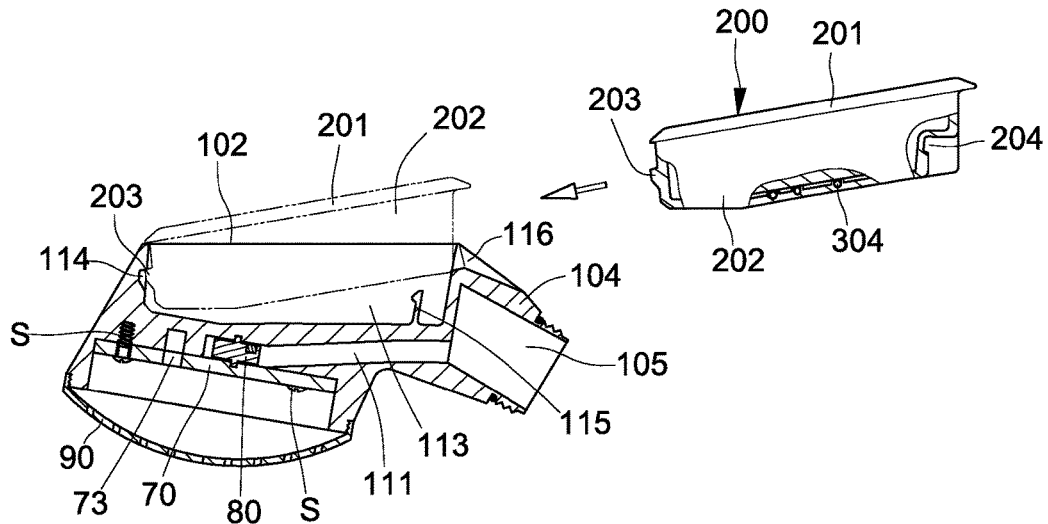
FIG. 13 is a first coupling illustrating view of an alerting pod with a showerhead shell in the conventional hand held shower head with filter replacing pre-alarm assembly.
Figure 14:
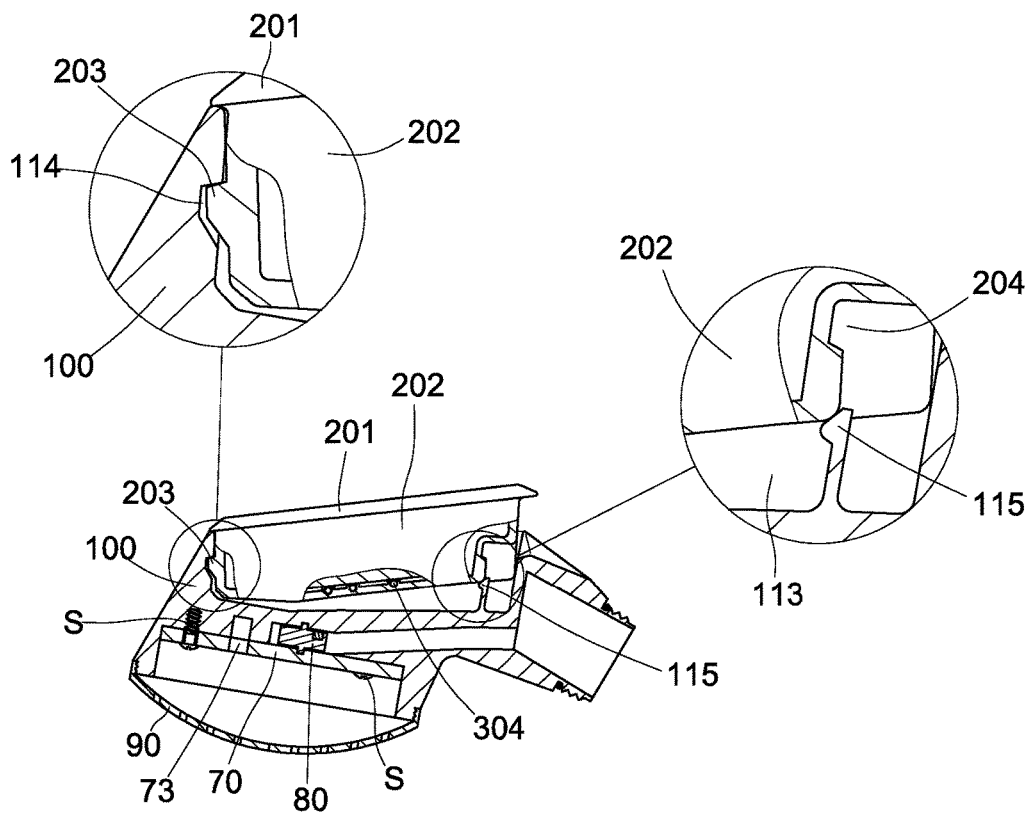
FIG. 14 is a second coupling illustrating view of the alerting pod with a showerhead shell in the conventional hand held shower head with filter replacing pre-alarm assembly.
Figure 15:
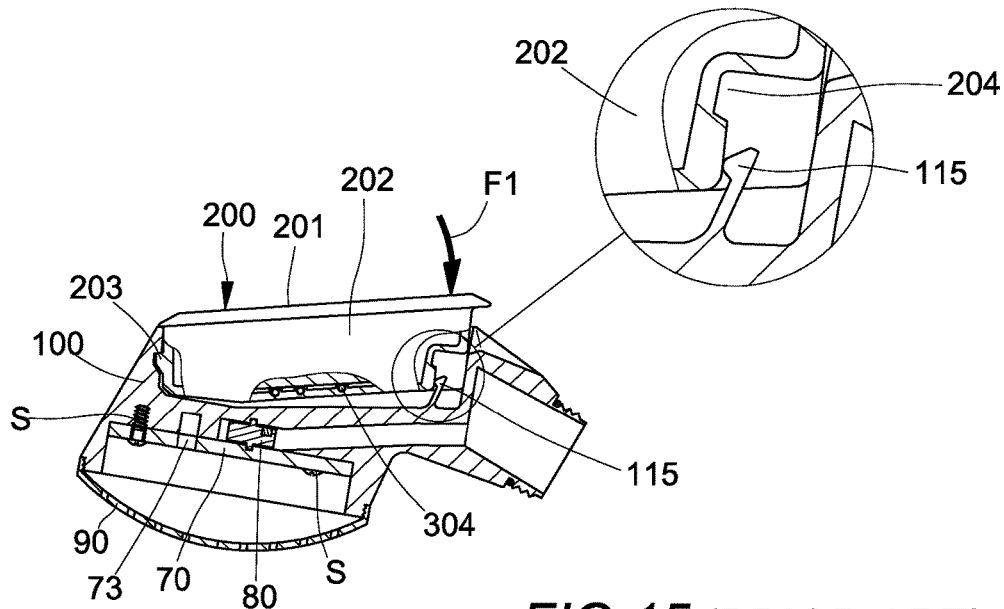
FIG. 15 is a third coupling illustrating view of the alerting pod with a showerhead shell in the conventional hand held shower head with filter replacing pre-alarm assembly.
Figure 16:
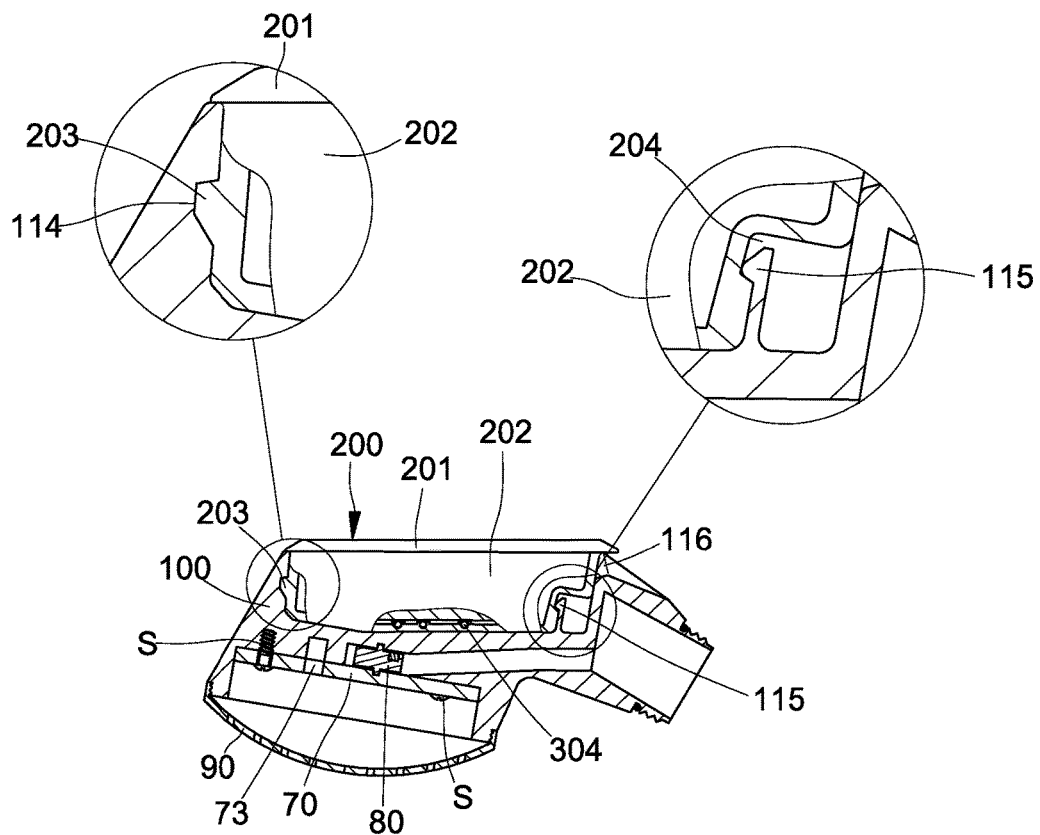
FIG. 16 is a fourth coupling illustrating view of the alerting pod with a showerhead shell in the conventional hand held shower head with filter replacing pre-alarm assembly.
Figure 17:
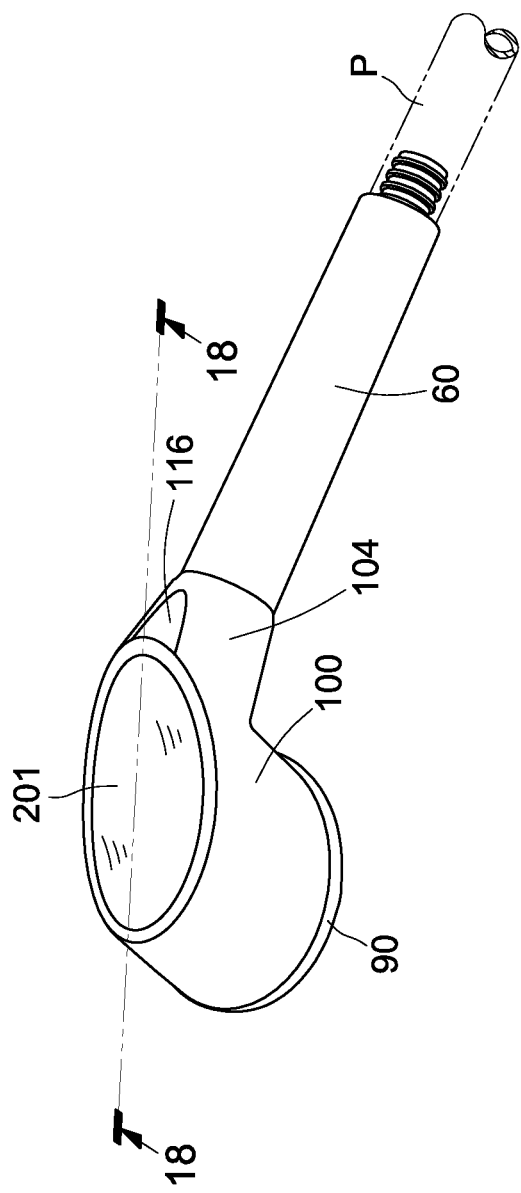
FIG. 17 is a perspective view showing assembly of a handle filter cartridge to a hand-held shower head capable of measuring and suggesting replacement of the filter according to a preferred embodiment of the present invention.
Figure 18:
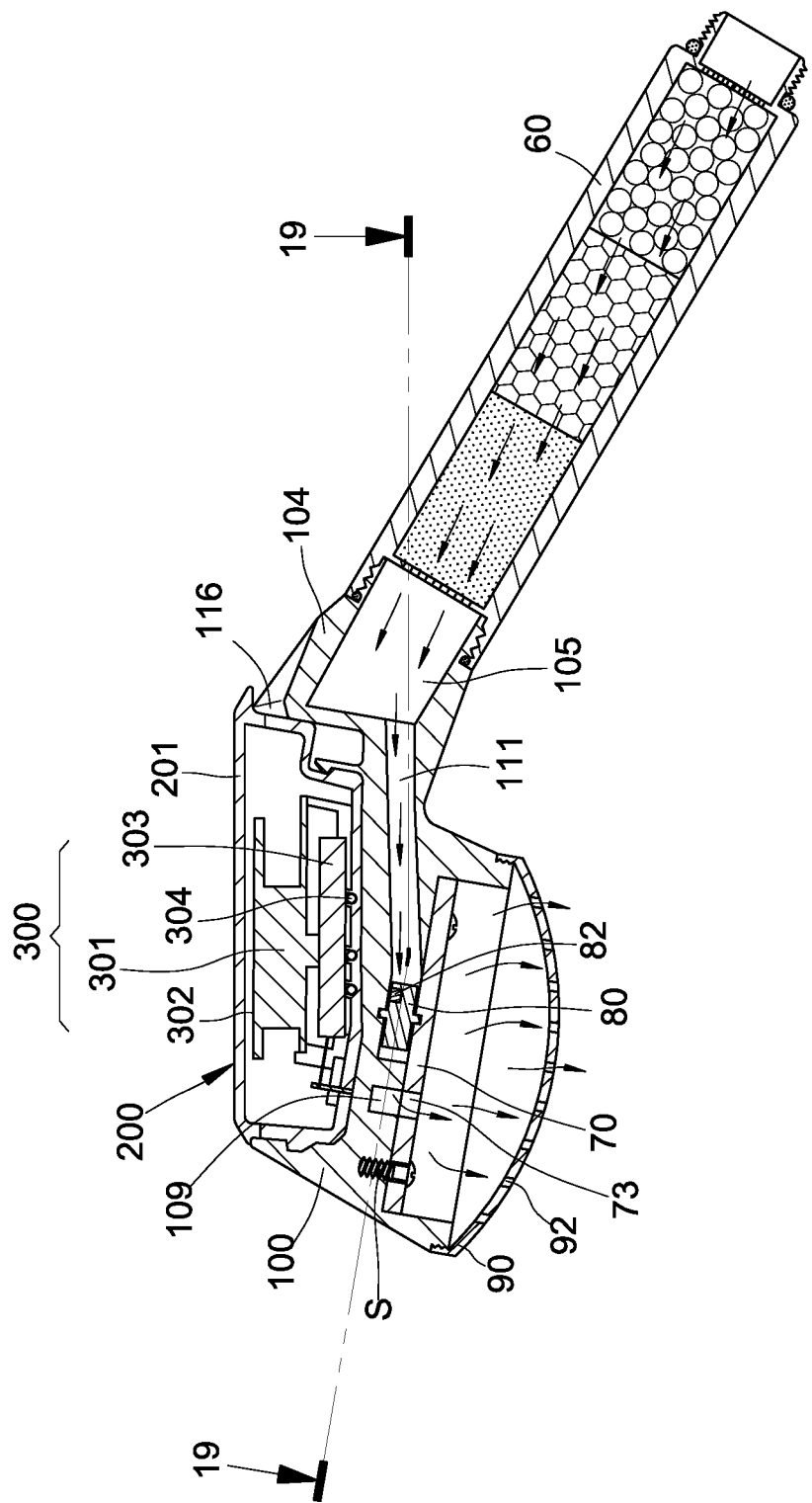
FIG. 18 is a cross sectional view taken against the section line 18-18 from previous FIG. 17.
Figure 19:
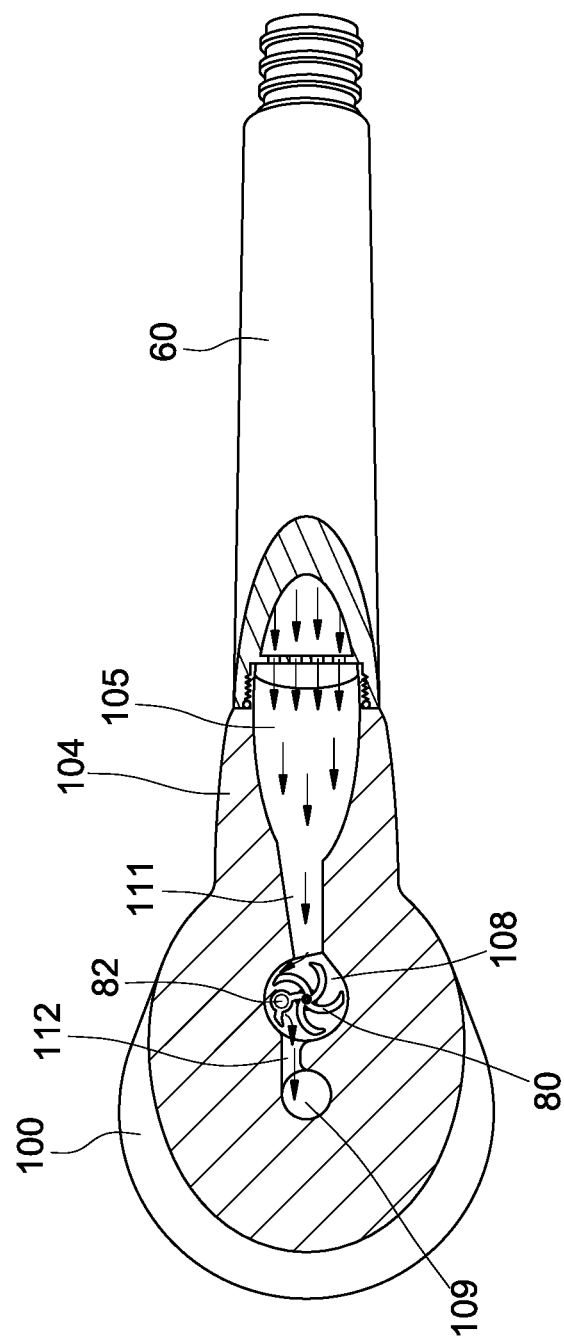
FIG. 19 is a cross sectional view taken against the section line 19-19 from previous FIG. 18.
Figure 20:
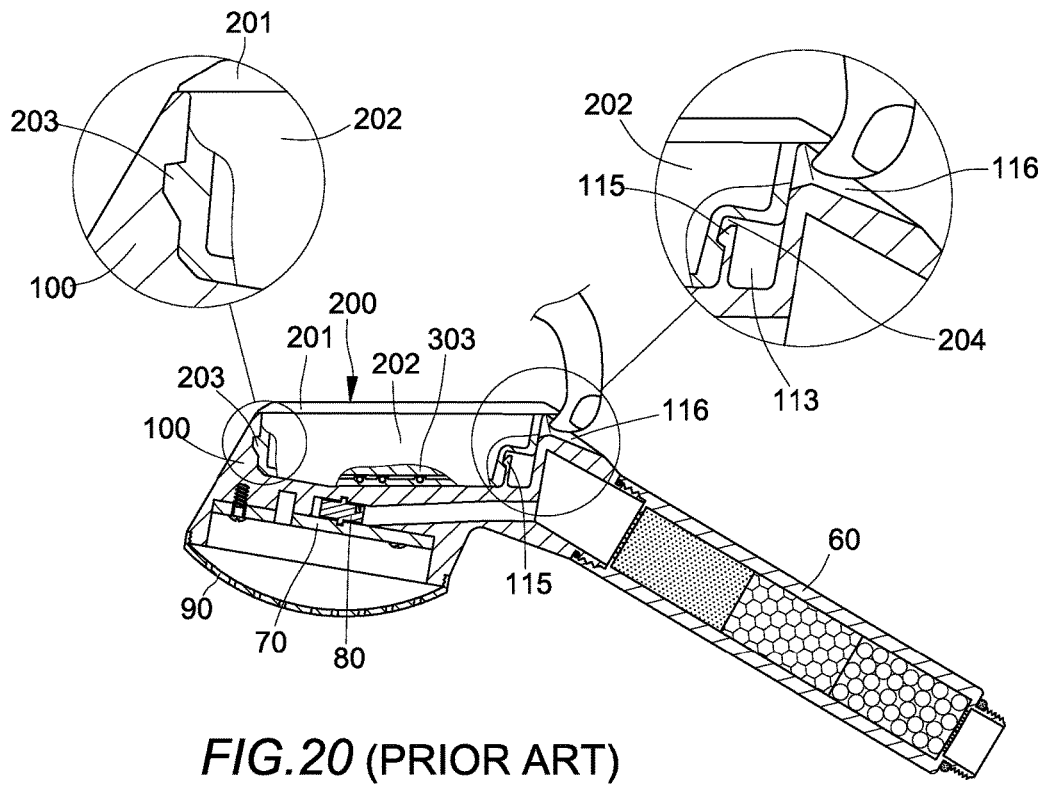
FIG. 20 is a first illustrative view showing lifting of the transparent lid of an alerting pod from a showerhead shell in the conventional handheld shower head with filter replacing pre-alarm device.
Figure 21:
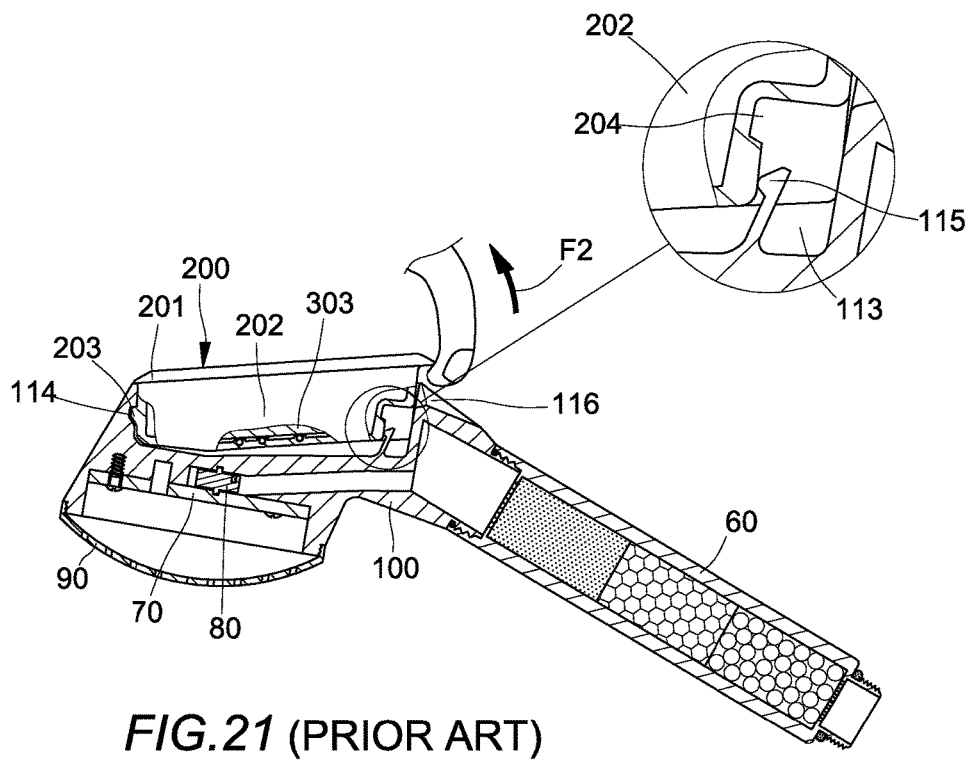
FIG. 21 is a second illustrative view showing the lifting of the transparent lid of the alerting pod from a showerhead shell in the conventional handheld shower head with filter replacing pre-alarm device.
Figure 22:
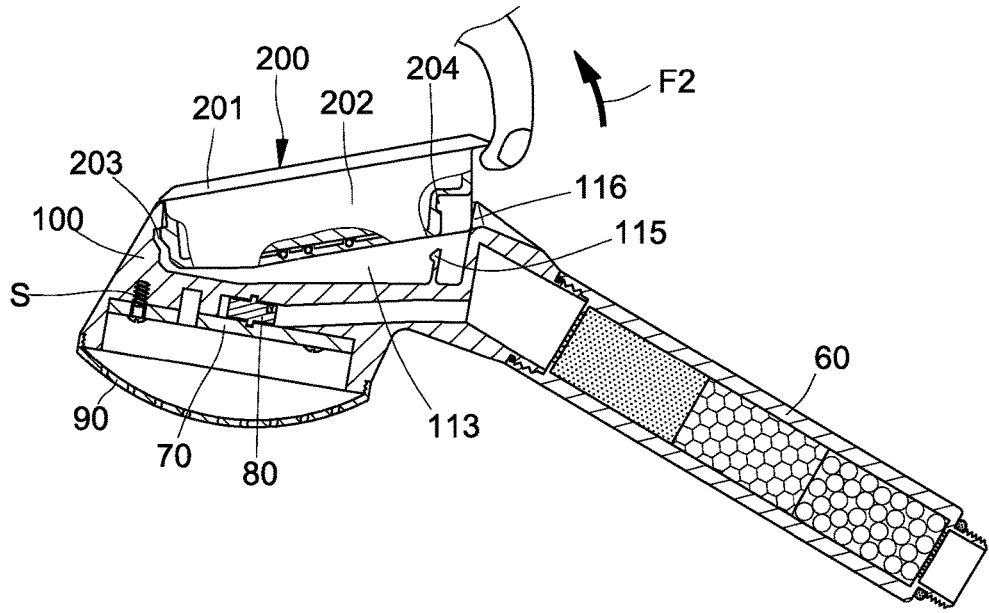
FIG. 22 is a third illustrative view showing the lifting of the transparent lid of the alerting pod from a showerhead shell in the conventional handheld shower head with filter replacing pre-alarm device.
Figure 23:
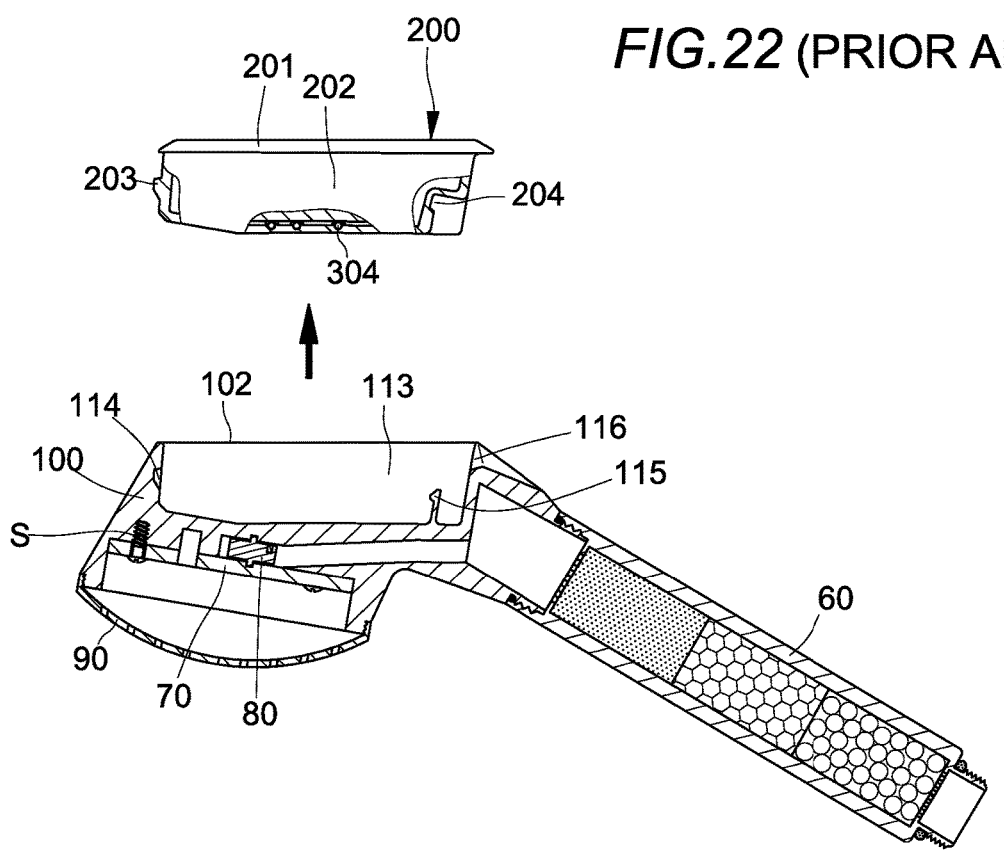
FIG. 23 is a fourth illustrative view showing the lifting of the transparent lid of the alerting pod from a showerhead shell in the conventional handheld shower head with filter replacing pre-alarm device.
Figure 25:
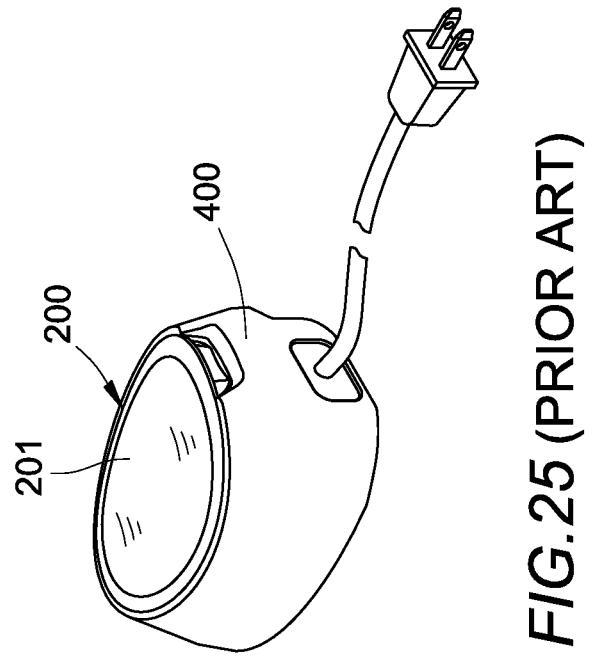
FIG. 25 is a perspective schematic view showing inserting of the alerting pod into a battery charger mount of a showerhead shell in the conventional handheld shower head with filter replacing pre-alarm device.
Figure 24:
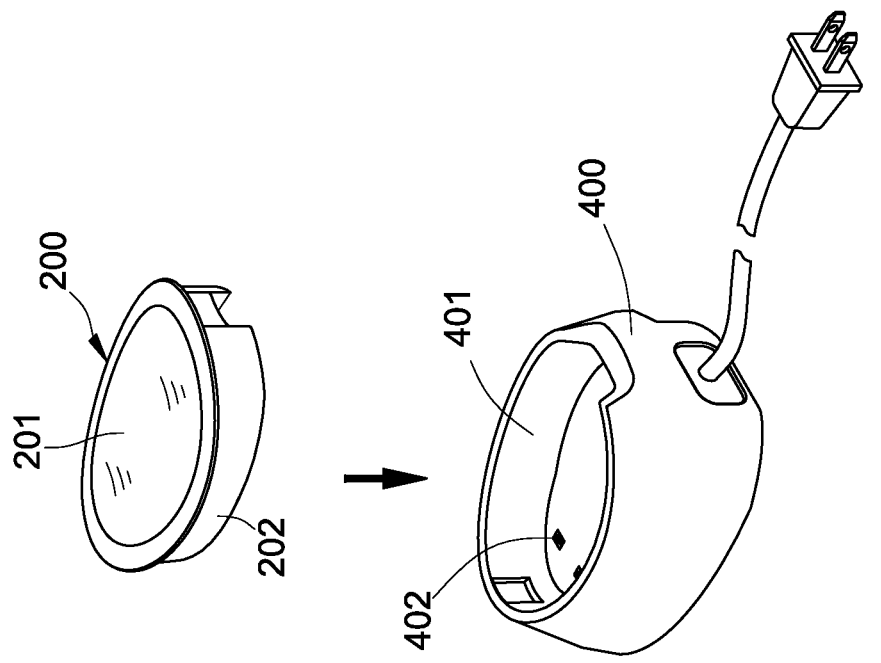
FIG. 24 is a perspective schematic view showing detaching of the alerting pod from a battery charger mount of a showerhead shell in the conventional handheld shower head with filter replacing pre-alarm device.
Figure 26:
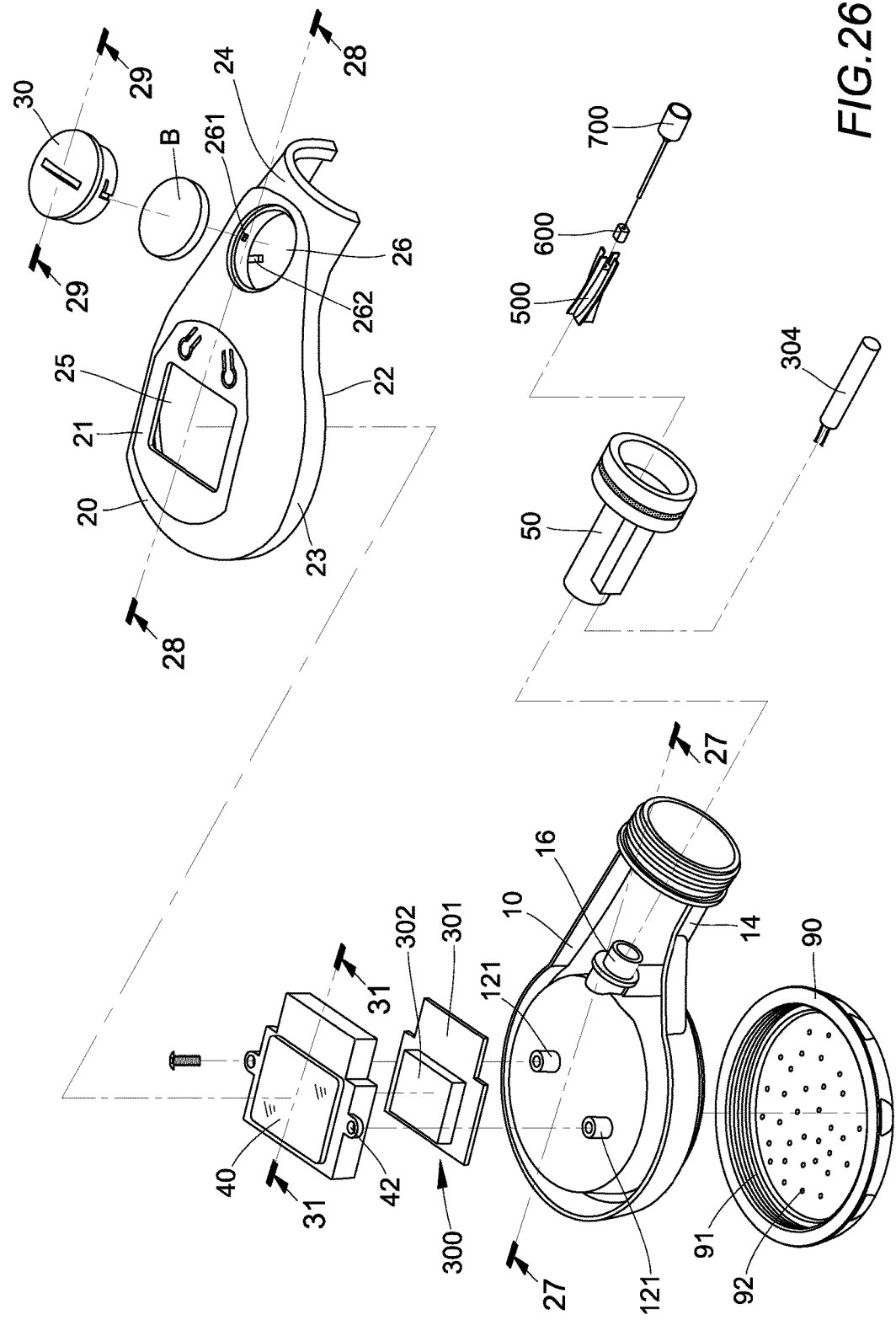
FIG. 26 is an exploded perspective view of a showerhead of the first exemplary embodiment of the present invention.
Figure 28:
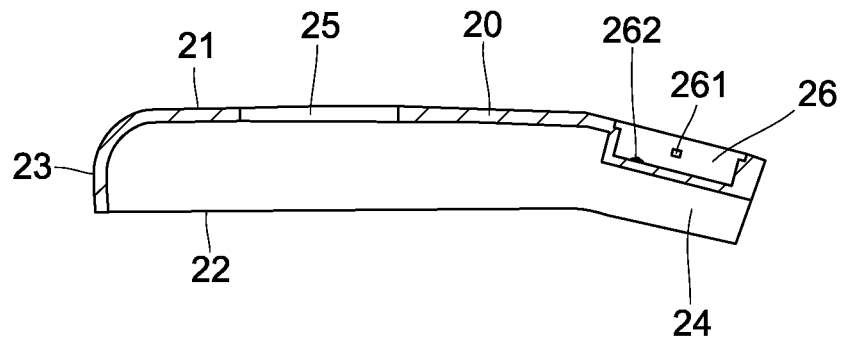
FIG. 28 is a cross sectional view taken against the section line 28-28 from previous FIG. 26.
Figure 27:
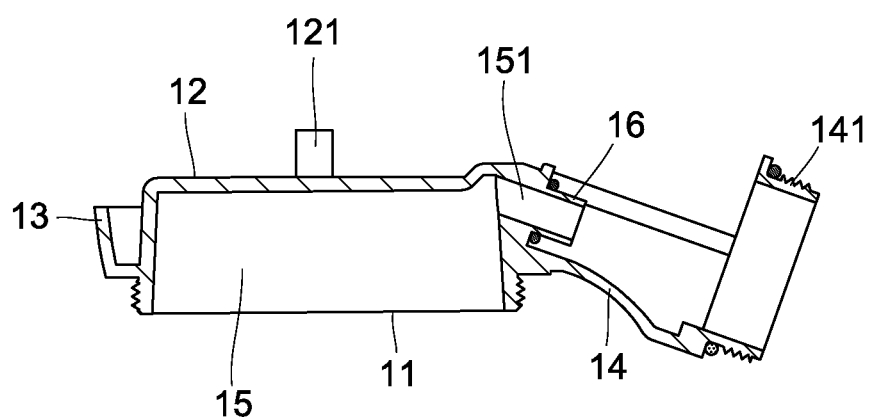
FIG. 27 is a cross sectional view taken against the section line 27-27 from previous FIG. 26.
Figure 29:
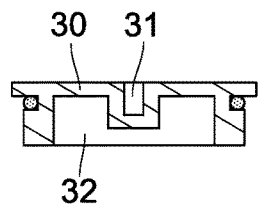
FIG. 29 is a cross sectional view taken against the section line 29-29 from previous FIG. 26.
Figure 30:
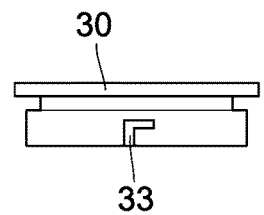
FIG. 30 is a lateral view of a battery lid in the first exemplary embodiment of the present invention.
Figure 31:
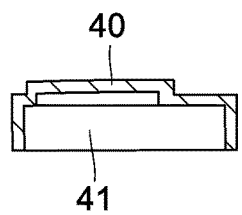
FIG. 31 is a cross sectional view taken against the section line 31-31 from previous FIG. 26.

Please refer to FIGS. 26 to 40 and FIG. 49. The hand-held shower head capable of measuring and suggesting replacement of filtering core handle of the first exemplary embodiment of the present invention includes an integrated showerhead lower shell 10, upper shell 20, and handle containing a handle filter cartridge 60, an integrated battery mount 26 and battery lid 30 with an embedded button-shaped battery B, a signal circuit device 300, a transparent cover 40, a spray hood 90, as well as a water flow measuring unit 50 containing an impeller shaft in axial flow mode 500, an inducting magnet 600, and a supporter in axial flow mode 700 (as shown in FIG. 26).

The showerhead lower shell 10, which is a plastic hollow casing extruded into a unitary piece, includes a shelf 13 with a front side 11 and a reverse side 12 that form an integral body such that the shelf 13 has an extending lower adapting section 14 that includes a distal joint cylinder 141 with a set of male threads on an outer periphery thereof and that extends towards the handle of the showerhead for securely joining with the handle filter cartridge 60. The front side 11 has an internal inwardly-extending water inlet groove 15, with a water inlet channel 151 extending through a distal end of tubular adapter 16 towards the lower adapting section 14, and a set of rim male threads 17 formed on an outer periphery thereof for mating with the corresponding spray hood 90. The reverse side 12 has two raised cylinders 121 with internal female threads, the cylinders 121 extending outwardly from a top surface of the shelf 13.

The showerhead upper shell 20, which is a plastic casing extruded into a unitary piece for suitably covering the back side 12 of the showerhead lower shell 10, includes a shelf 23 having a front side 21 and a reverse side 22 and formed as an integral body, wherein the shelf 23 has an extending upper handle filter cartridge mounting section 24 that extends towards the handle of the showerhead such that the profiles and sizes of the shelf 23 and extending upper handle filter cartridge mounting section 24 are the same as those of the corresponding shelf 13 and lower handle filter cartridge mounting section 14 of the showerhead lower shell 10. On the top surface of the front side 21, a viewing window 25 is created over the rear thereof while near the upper handle filter cartridge mounting section 24, a battery mount 26 is created with two internal projections 261 in the internal vertical wall and an internal electrical battery contact 262 in the internal bottom.

Figure 49:
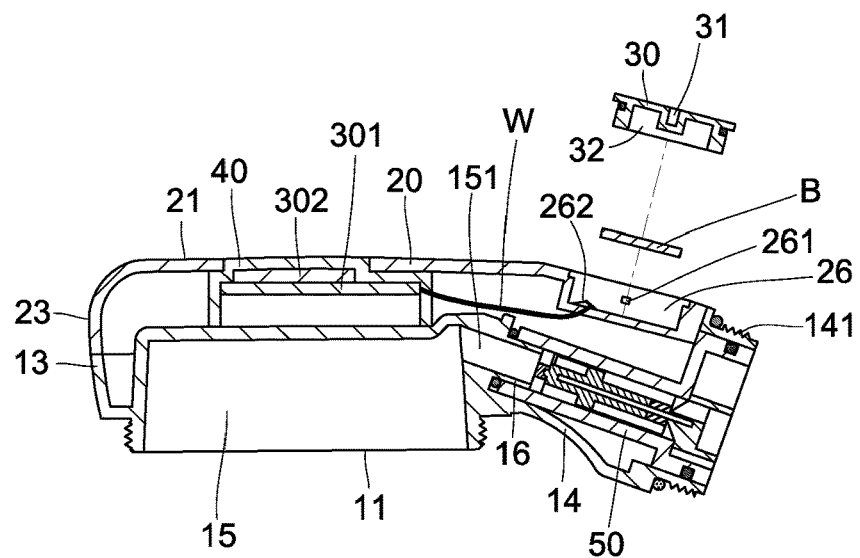
FIG. 49 is a ninth schematic view showing assembly of the first exemplary embodiment of the present invention.
Figure 50:
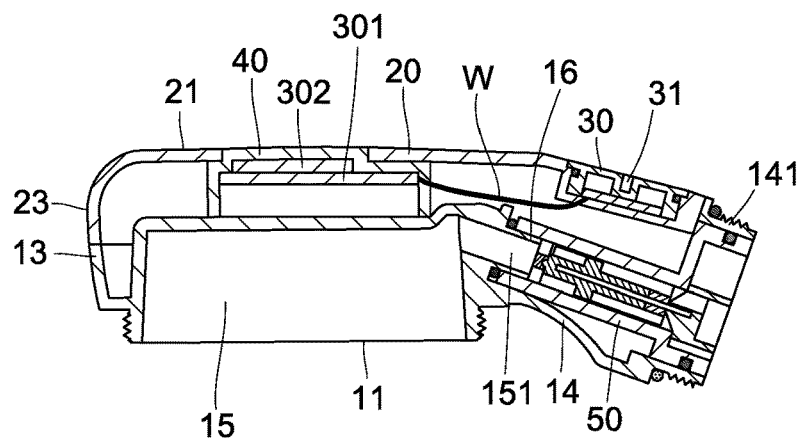
FIG. 50 is a tenth schematic view showing assembly of the first exemplary embodiment of the present invention.

The battery lid 30, which is embedded into the battery mount 26 of the showerhead upper shell 20, includes a lid rotating notch 31 created on the top surface thereof, a battery cavity 32 created in the bottom section thereof for holding a button-shaped battery B available in the market (as shown in FIGS. 49 and 50), and two snap notches 33 created in the lateral wall thereof for securely latching with corresponding two internal projections 261 of the battery mount 26 in the showerhead upper shell 20.

The transparent cover 40, which is a transparent cover extruded into a unitary piece for being wrapped by the viewing window 25 in the front side 21 of the showerhead upper shell 20, includes a holding cavity 41 extending inwardly into the bottom side of the cover 40 for containing the microprocessor 301 and LCD display circuit 302 of the signal circuit device 300, and a pair of bored holding lugs 42 extending from opposed sides of the cover 40 for mating with a corresponding pair of raised cylinders with internal female threads 121 in the back side 12 of showerhead lower shell 10 by means of screws S.

Figure 32:
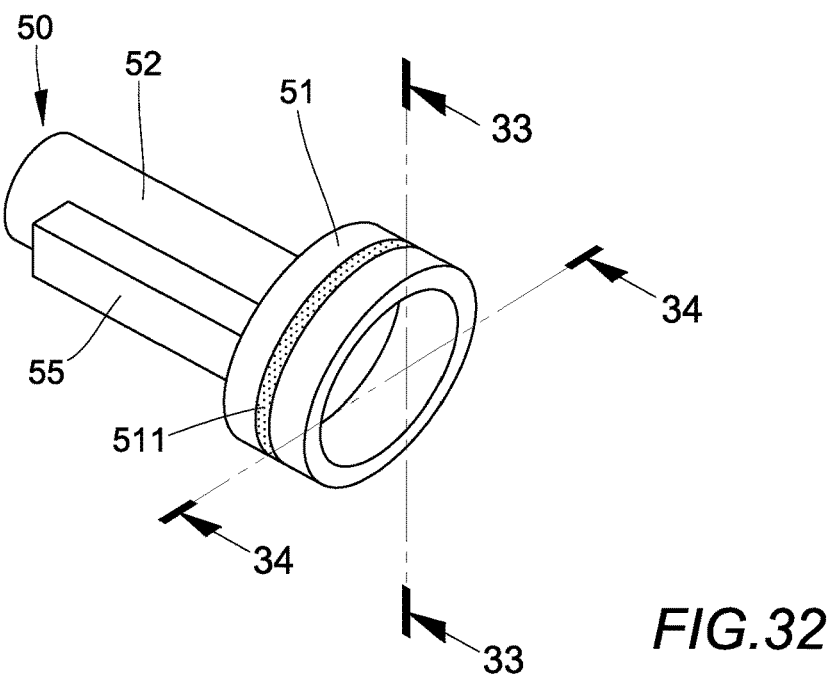
FIG. 32 is a perspective view of a water flow measuring unit in the first exemplary embodiment of the present invention.
Figure 33:
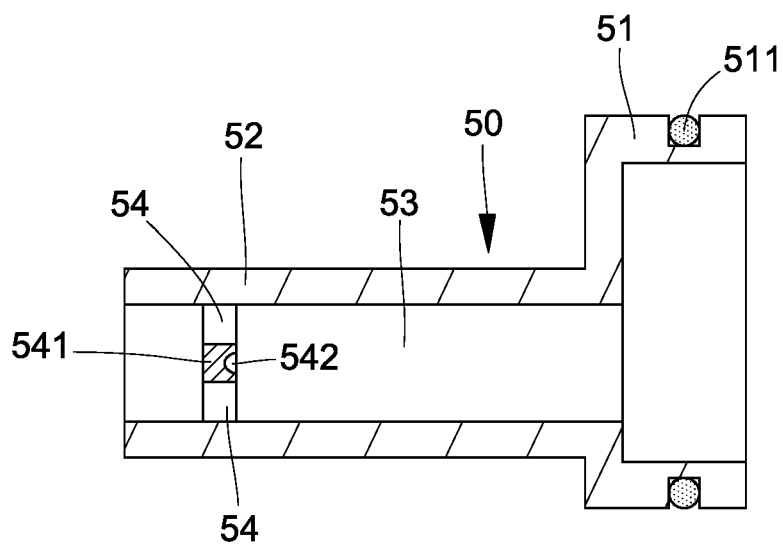
FIG. 33 is a cross sectional view taken against the section line 33-33 from previous FIG. 32.
Figure 34:
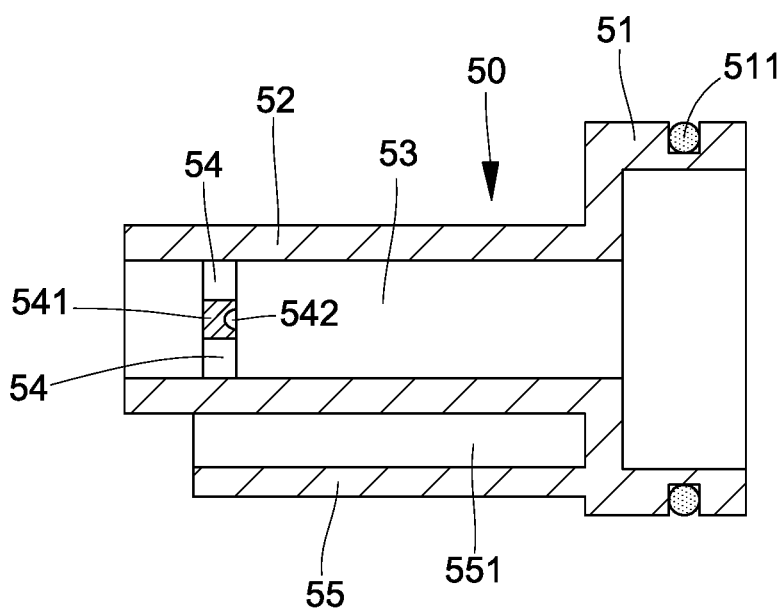
FIG. 34 is a cross sectional view taken against the section line 34-34 from previous FIG. 32.
Figure 44:
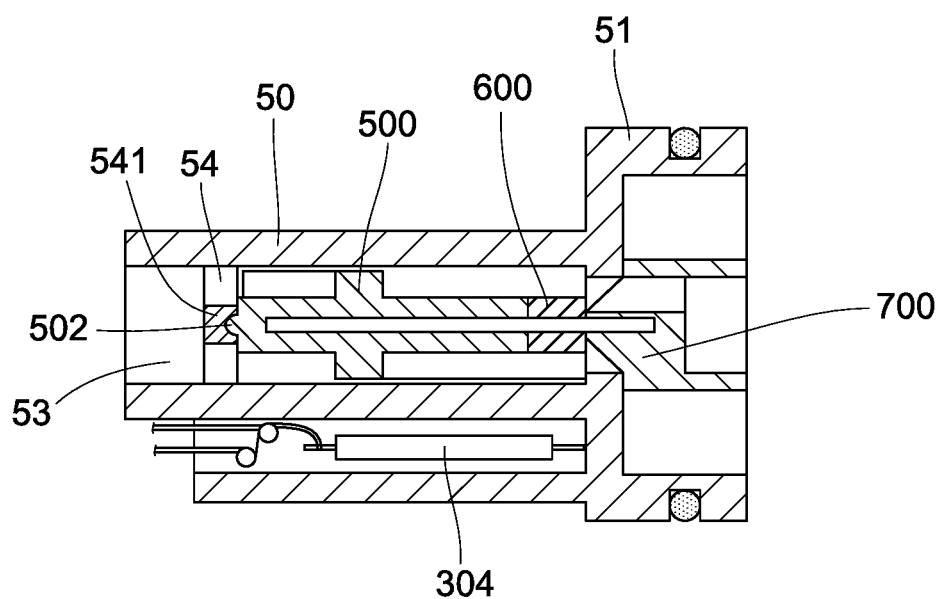
FIG. 44 is a fourth schematic view showing assembly of the first exemplary embodiment of the present invention.

The water flow measuring unit 50, which is a stacked body having a two-section configuration, includes an upper section of an upper hollow column 52, a lower section of a base hollow column 51, and a water channel 53 that runs through both the base hollow column 51 and upper hollow column 52. The base hollow column 51 has a sealing ring 511 inlaid into the circumference thereof, and the upper hollow column 52 is flanked by a hollow pillar 55 with a tubular opening 551 for accommodating a magnetic reed switch 304 (as shown in FIGS. 32 and 44), wherein the outer diameter of the base hollow column 51 is slightly less than the inner diameter of the distal joint cylinder 141 of the extending lower handle filter cartridge mounting section 14 in the showerhead lower shell 10, which enables the water flow measuring unit 50 to be completely inserted into the distal joint cylinder 141 in the showerhead lower shell 10. The water channel 53 includes a plurality of blocking vanes 54 radially disposed in the upper portion thereof on a downstream side of the impeller such that the bushing formed by all inward blocking vanes 54 embraces a central suspended body composed of an upper baffle 541 and a lower docking notch 542 (as shown in FIGS. 32 through 34).

The spray hood 90, which is a plastic disk extruded into a unitary piece, has female threads 91 extending around the bottom rim thereof and a plurality of water spray holes 92 spread over the surface of the spray hood 90 so that the female threads 91 can mate with the rim male threads 17 on the front side 11 of the showerhead lower shell 10 by screwing engagement while the water spray holes 92 enable the water in the water inlet groove 15 on the front side 11 of the showerhead lower shell 10 to jet out.

Figure 35:
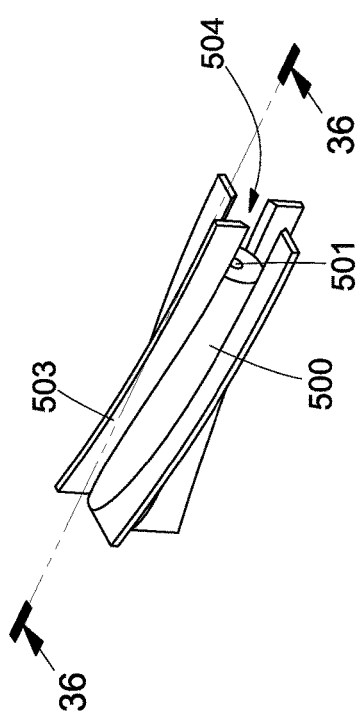
FIG. 35 is a perspective view of an impeller shaft in axial flow mode in the first exemplary embodiment of the present invention.
Figure 36:
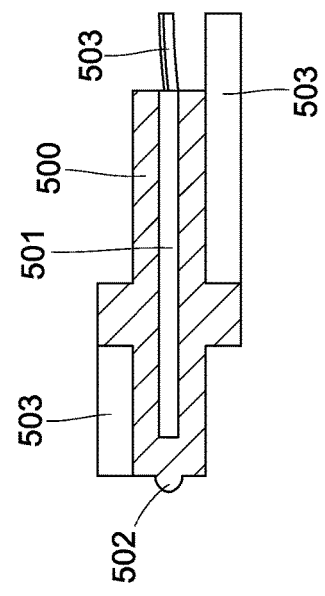
FIG. 36 is a cross sectional view taken against the section line 36-36 from previous FIG. 35.

The impeller shaft 500, which is inserted into the water channel 53 in the water flow measuring unit 50, includes a bottom central bushing 501, an upper axial docking projection 502, a plurality of circumferential spiral vanes 503 and a bottom round gapped receptacle 504 encompassed by the bottom ends of the spiral vanes 503 (as shown in FIGS. 35 and 36).

Figure 37:
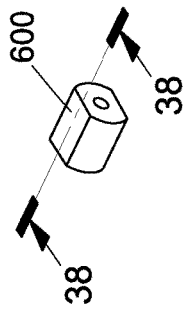
FIG. 37 is a perspective view of an inducting magnet in the first exemplary embodiment of the present invention.
Figure 38:
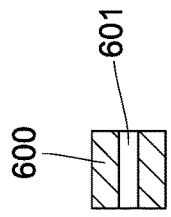
FIG. 38 is a cross sectional view taken against the section line 38-38 from previous FIG. 37.
Figure 42:
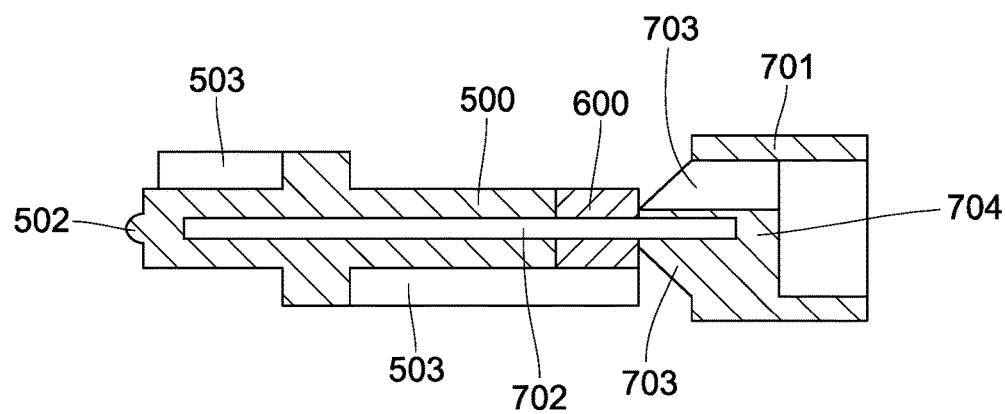
FIG. 42 is a second schematic view showing assembly of the first exemplary embodiment of the present invention.
Figure 43:
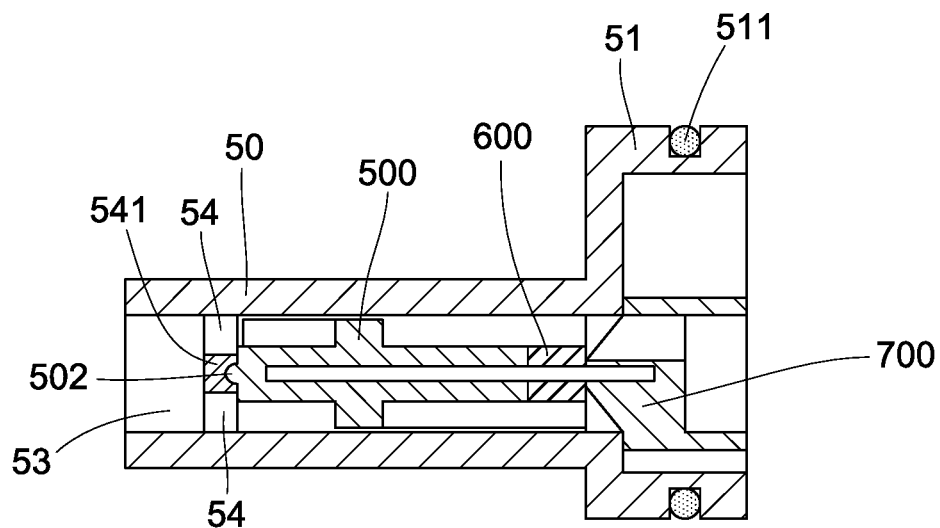
FIG. 43 is a third schematic view showing assembly of the first exemplary embodiment of the present invention.

The inducting magnet 600, which is a truncated section of a cylindrical magnet placed in the bottom round gapped receptacle 504 of the impeller shaft 500, includes a central bushing 601 (as shown in FIGS. 37 and 38) that runs through the inducting magnet 600. The diameter of the central bushing 601 is the same as and in alignment with that of the central bushing 501 in the impeller shaft 500 (as shown in FIGS. 42 through 44).

Figure 39:
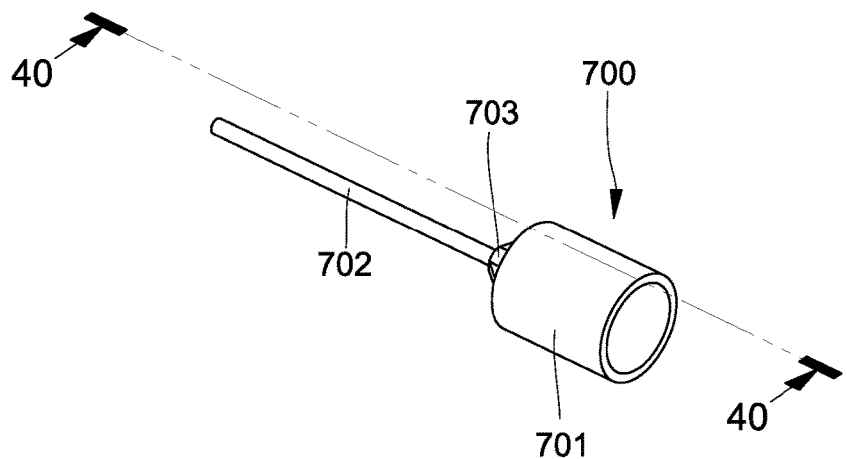
FIG. 39 is a perspective view of a supporter in axial flow mode in the first exemplary embodiment of the present invention.
Figure 39A:
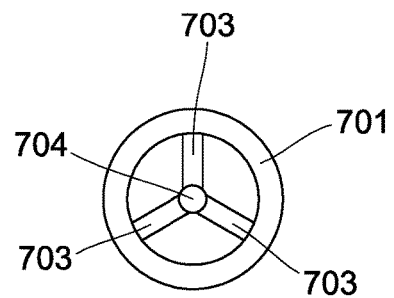
FIG. 39a is a lateral view of the supporter in axial flow mode in the first exemplary embodiment of the present invention.
Figure 40:
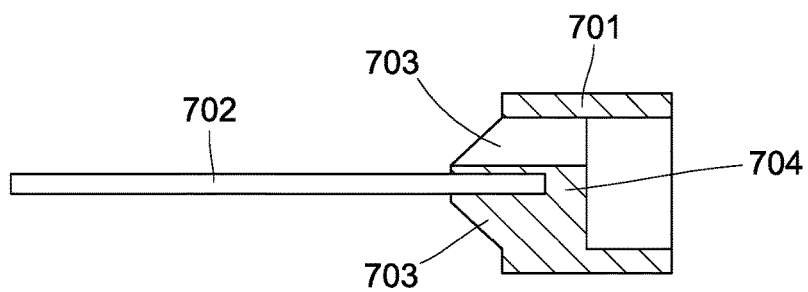
FIG. 40 is a cross sectional view taken against the section line 40-40 from previous FIG. 39.

The supporter 700, which coupled to the impeller shaft 900 via the inducting magnet 910, includes a cylindrical mount 701, a metallic supporting shaft 702, a supporting tripod 703 with three radial ribs and a supporting base 704 located at an upstream end of the water channel. The supporting base 704 is configured under the radial ribs of the supporting tripod 703 (as shown in FIG. 39*a*), such that the metallic supporting shaft 702 is centrally erected at the bushing formed by all inward radial ribs of the supporting tripod 703 (as shown in FIGS. 39 and 40).

The signal circuit device 300, which is accommodated in the holding cavity 41 under the transparent cover 40, includes a microprocessor 301, a LCD display circuit 302, and a magnetic reed switch 304, which is embedded in the tubular hollow 551 of the flanked hollow pillar 55 for the water flow measuring unit 50 (as shown in FIGS. 26 and 34), wherein the microprocessor 301 is respectively connected to the electrical battery contact 262 in the battery mount 26 of the showerhead upper shell 20 and the magnetic reed switch 304 in the tubular passage 551 of the hollow pillar 55 on the water flow measuring unit 50 via electric wires L (as shown in FIG. 49). The button-shaped battery B, which is embedded in the battery cavity 32 under the battery lid 30, supplies power to the related power-consuming components of the signal circuit device 300, and may be either a nickel-chromium battery, a nickel battery or a lithium battery, with the magnetic reed switch 304 being replaceable by a Hall-effect component.

Figure 41:
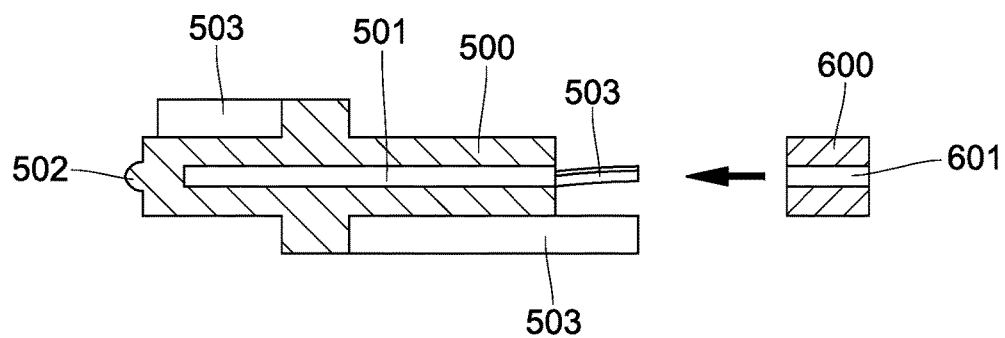
FIG. 41 is a first schematic view showing assembly of the first exemplary embodiment of the present invention.
Figure 45:
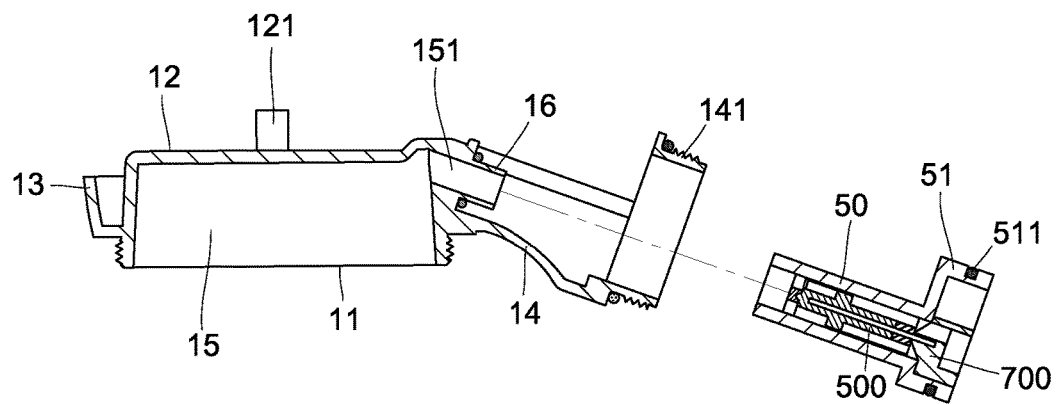
FIG. 45 is a fifth schematic view showing assembly of the first exemplary embodiment of the present invention.
Figure 46:
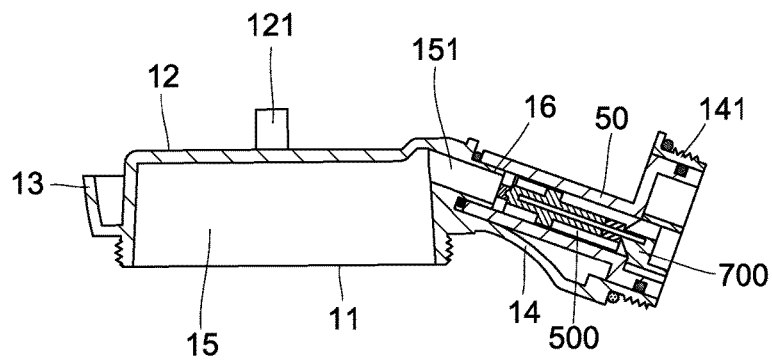
FIG. 46 is a sixth schematic view showing assembly of the first exemplary embodiment of the present invention.
Figure 47:
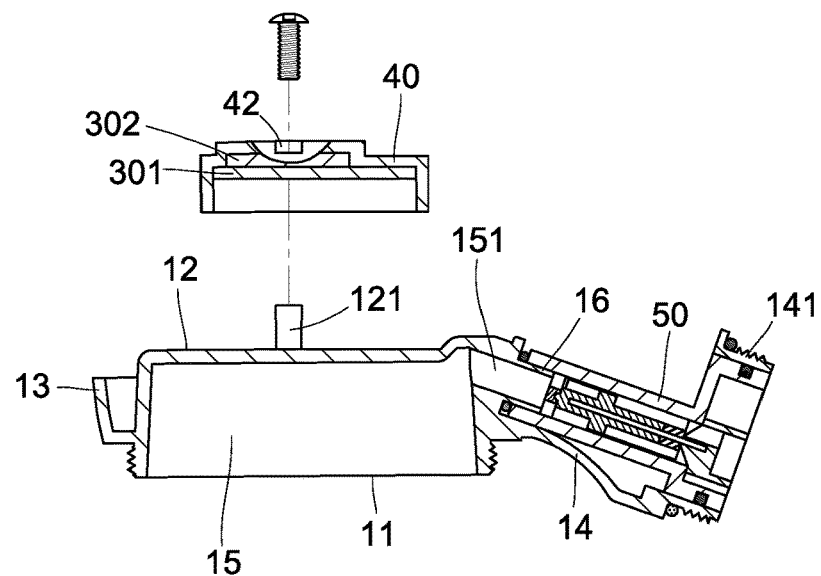
FIG. 47 is a seventh schematic view showing assembly of the first exemplary embodiment of the present invention.
Figure 48:
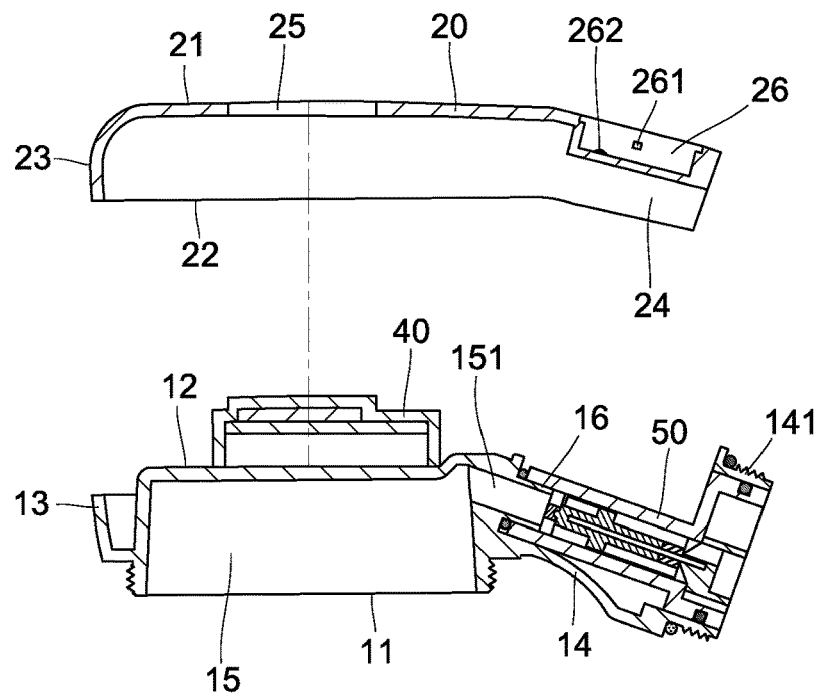
FIG. 48 is an eighth schematic view showing assembly of the first exemplary embodiment of the present invention.

Please refer to FIGS. 41 to 52. The assembly procedure for the first exemplary embodiment of the present invention is stepwise performed as follows.

a. First, the inducting magnet 600 is placed in the round gapped receptacle 504 of the impeller shaft 500 (as shown in FIG. 41) so that the diameter of the central bushing 601 is in alignment with that of the central bushing 501 in the impeller shaft 500. The metallic supporting shaft 702 is then sequentially inserted through the central bushing 601 of the inducting magnet 600 and the central bushing 501 of the impeller shaft 500 respectively (as shown in FIG. 42).

b. Second, the impeller shaft 500 is inserted into the water channel 53 of the water flow measuring unit 50 by facing the axial docking projection 502 thereof toward the entrance of the water channel 53 until the axial docking projection 502 touches against the docking notch 542 of the blocking vanes 54 (as shown in FIG. 43), and the magnetic reed switch 304 is then placed into the tubular hollow 551 in the hollow pillar 55 of the water flow measuring unit 50 (as shown in FIG. 44).

c. Third, the upper hollow column 52 is oriented to face forwards, and the integral water flow measuring unit 50 from previous step b is placed into the distal joint cylinder with external male threads 141 in the lower handle filter cartridge mounting section 14 of the showerhead lower shell 10 such that the front opening of the upper hollow column 52 wraps over the tubular adapter 16 of the showerhead lower shell 10. Meanwhile, the sealing ring 511 of the base hollow column 51 is allowed to hermetically contact the internal wall of the distal joint cylinder with external male threads 141 to prevent water leakage (as shown in FIGS. 45 and 46).

d. Fourth, the magnetic reed switch 304 is connected to the microprocessor 301 of the signal circuit device 300 via electric wire L, and the LCD display circuit 302 and microprocessor 301 of the signal circuit device 300 are embedded into the holding cavity 41 of the transparent cover 40 (as shown in FIG. 46), after which the two lugs 42 of the transparent cover 40 are jointed to the corresponding raised cylinders with internal female threads 121 in the back side 12 of the showerhead lower shell 10 by means of screws S (as shown in FIG. 47).

e. Fifth, the microprocessor 301 of the signal circuit device 300 is connected to the electrical battery contact 262 in the battery mount 26 of the showerhead upper shell 20 via electric wire L, and then the showerhead upper shell 20 is fused with the showerhead lower shell 10 via a high frequency fusing method after alignment and contact of the viewing window 25 of the showerhead upper shell 20 with the back side 12 of the showerhead lower shell 10.

f. Finally, the two snap notches 33 of the battery lid 30 are firmly aligned with and latched to the corresponding two projections 261 in the battery mount 26 of the showerhead upper shell 20 after insertion of the button-shaped battery B into the battery lid 30 (as shown in FIGS. 47 through 52). Meanwhile, the button-shaped battery B contacts the electrical battery contact 262 in the battery mount 26 of the showerhead upper shell 20 so that power from the button-shaped battery B can be suitably supplied to the microprocessor 301, LCD display circuit 302 and magnetic reed switch 304 of the signal circuit device 300 to complete the assembly for the first exemplary embodiment of the present invention.

Based on the quantity of water flow (Q), the total filtered water quantity flowing through the handle filter cartridge 60 is measured and displayed on the LCD display circuit 302, and the result is stored by the microprocessor 301. The result can be processed to predict the remaining service life time of the handheld showerhead. Thereby, a user of the showerhead can get real time statistical data of the total filtered water quantity that has flowed through handle filter cartridge 60 by simply looking at the LCD display circuit 302 via the transparent cover 40 of the viewing window 25 in the showerhead upper shell 20. Once the total filtered water quantity that has flowed through handle filter cartridge 60 reaches (or nearly reaches) a predetermined critical value for the rated service life time of the specific handle filter cartridge 60, the microprocessor 301 will send an alerting signal with current data of the total filtered water quantity to the LCD display circuit 302 for reminding the user that it is time to replace the handle filter cartridge 60 in order to assure good quality of the handle filter cartridge 60 and the water filtered thereby. Therefore, the user can avoid the harmful consequences to health caused by unclean shower water W that would result if the replacement time were to be missed and an ineffective handle filter cartridge 60 continued to be used.

Figure 53:
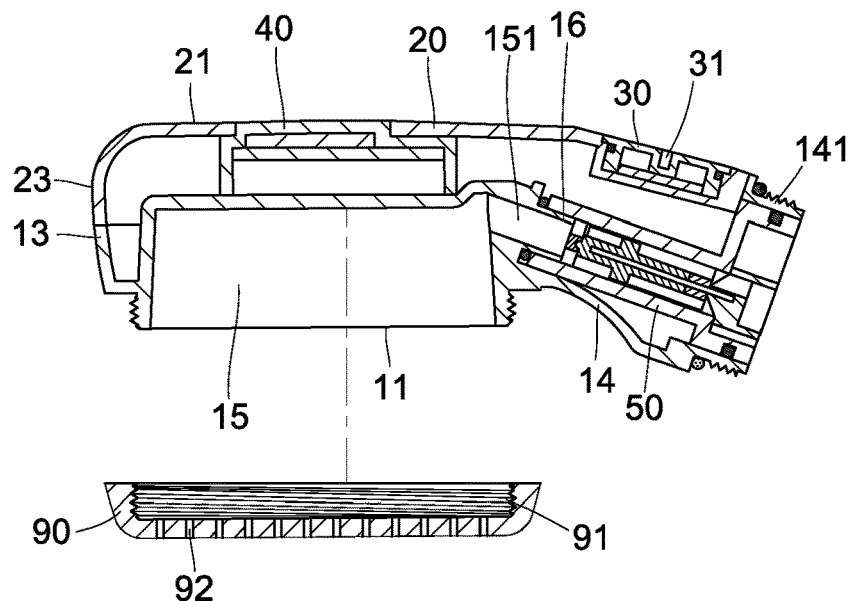
FIG. 53 is a first illustrative view showing assembly of a spray hood to a showerhead lower shell in the first exemplary embodiment of the present invention.
Figure 54:
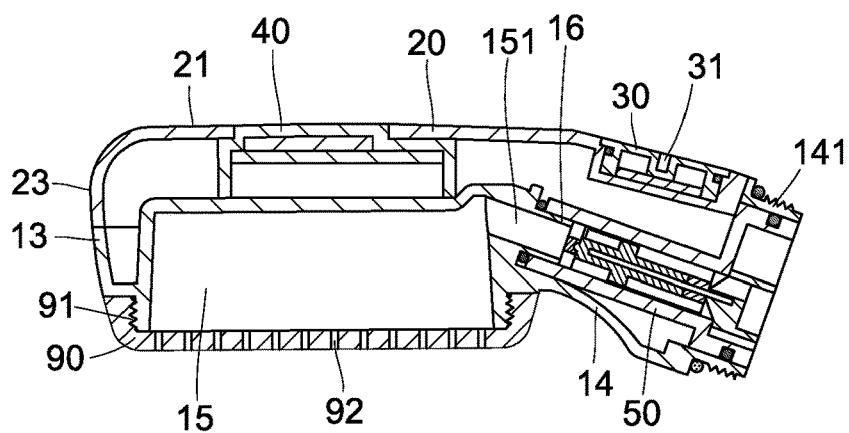
FIG. 54 is a second illustrative view showing assembly of the spray hood with the showerhead lower shell in the first exemplary embodiment of the present invention.
Figure 55:
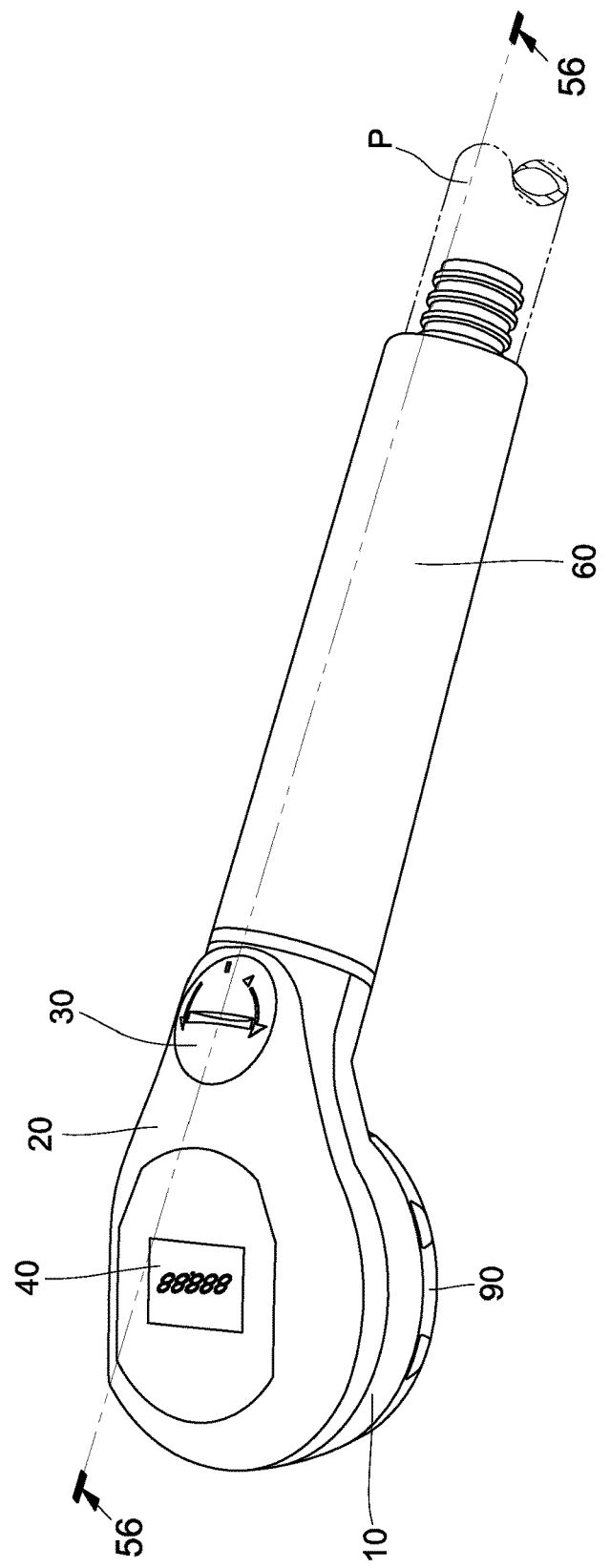
FIG. 55 is a perspective schematic view showing assembly of a handle filter cartridge to the showerhead in the first exemplary embodiment of the present invention.
Figure 56:
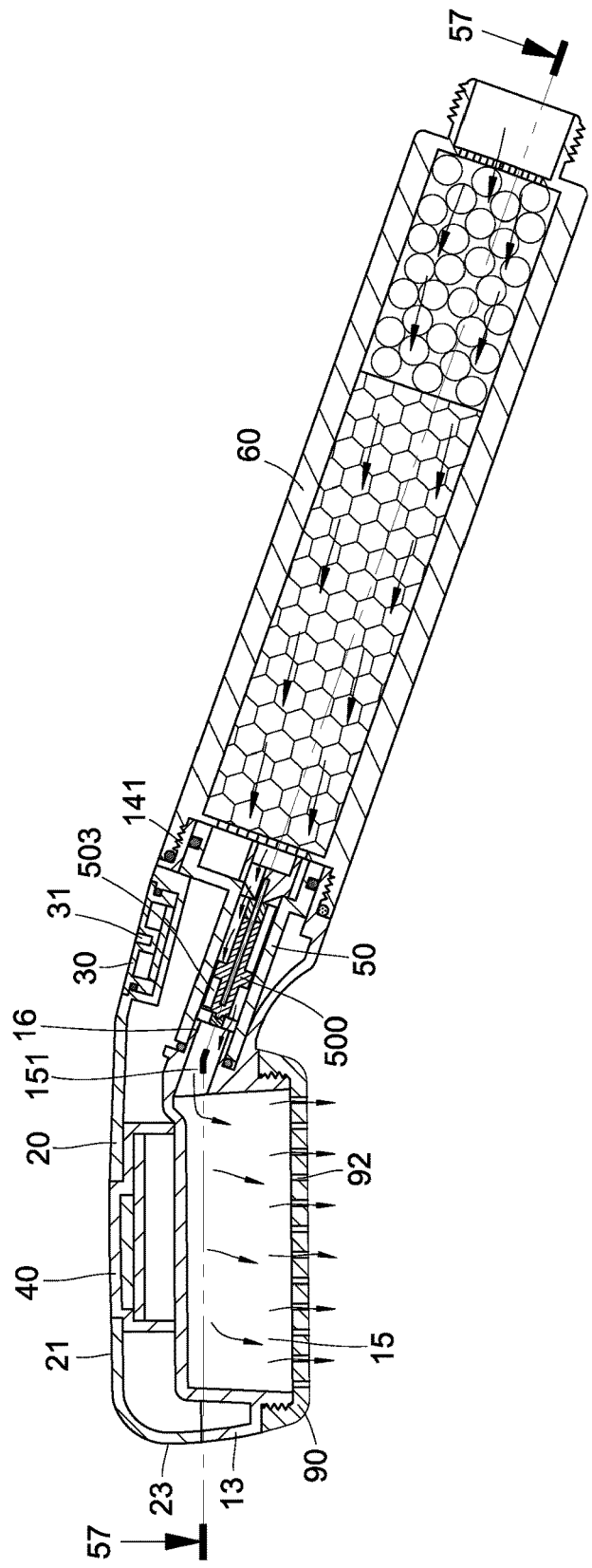
FIG. 56 is a cross sectional view taken against the section line 56-56 from previous FIG. 55.
Figure 57:
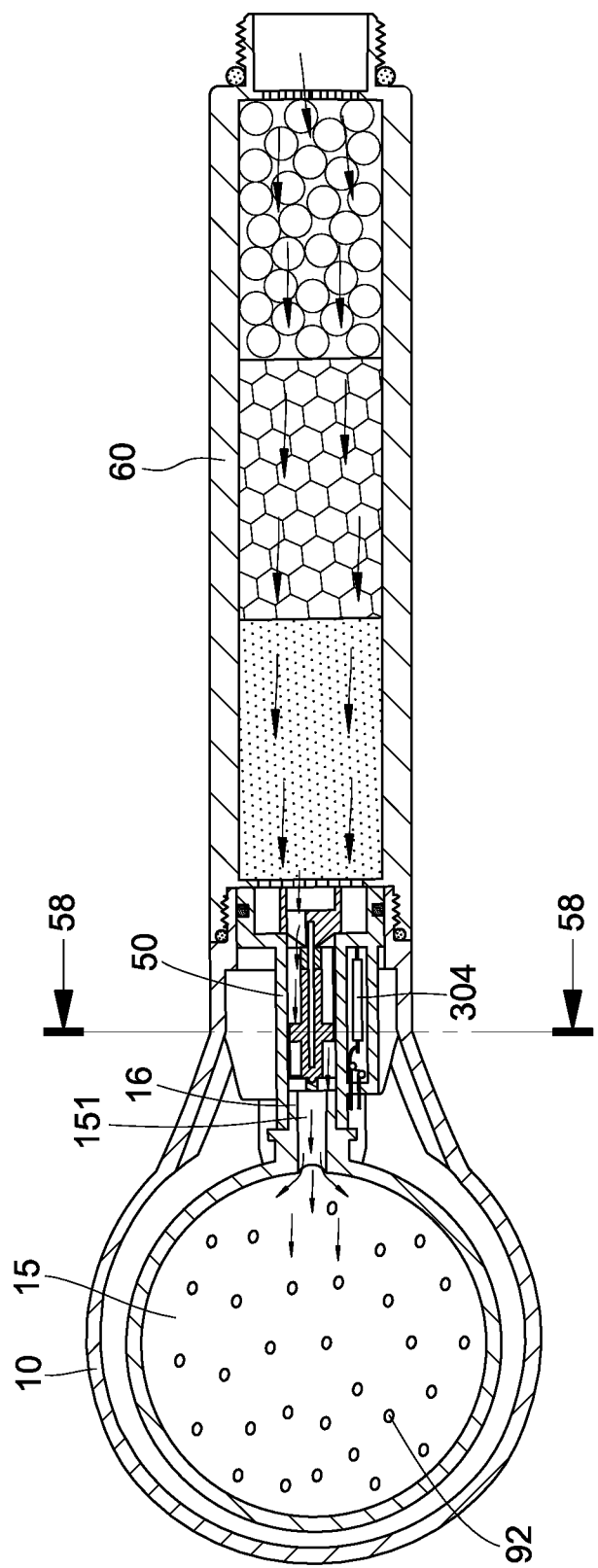
FIG. 57 is a cross sectional view taken against the section line 57-57 from previous FIG. 56.
Figure 58:
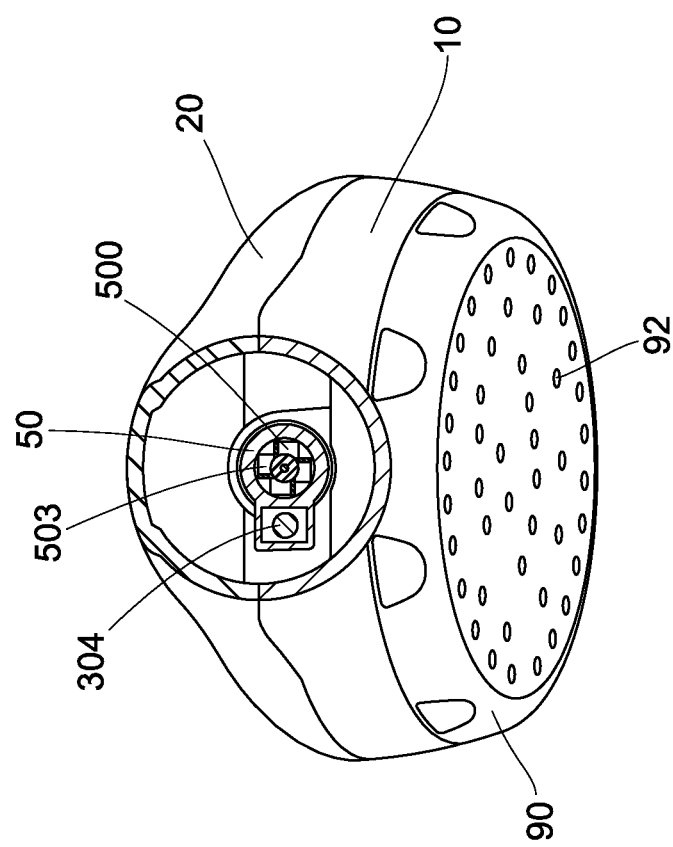
FIG. 58 is a cross sectional view taken against the section line 58-58 from previous FIG. 57.

Please refer to FIGS. 53 through 58. The operation for the first exemplary embodiment of the present invention is as follows. Before the operation of the present invention, the spray hood 90 is first screwed onto the rim male threads 17 on the showerhead lower shell 10 (as shown in FIGS. 53 and 54), and then the handle filter cartridge 60 is screwed to the distal joint cylinder with external male threads 141 on the lower handle filter cartridge mounting section 14 of the showerhead lower shell 10 to make the showerhead ready for use. Once the shower water W from the detachable water pipe P flows through the handle filter cartridge 60 of the showerhead, it passes through the supporting tripod 703 of the cylindrical mount 701 in the supporter in axial flow mode 700 to drive the spiral vanes 503 of the impeller shaft in axial flow mode 500 to rotate (as shown in FIG. 58), and finally the shower water W will jet out from the spray holes 92 of the spray hood 90 on the front side 11 of the showerhead lower shell 10 after it flows into the water inlet groove 15 via the water inlet channel 151 of the showerhead lower shell 10 to provide a bathing shower (as shown in FIGS. 56 and 57). During the foregoing bathing shower operation, for each rotation of the spiral vanes 503 and impeller shaft 500 driven by the running shower water W, the inducting magnet 600 in the round gapped receptacle 504 of the impeller shaft 500 will simultaneously cause the magnetic reed switch 304 in the hollow pillar 55 of the water flow measuring unit 50 to induce a switching signal (as shown in FIG. 58), which is relayed to the microprocessor 301 in the signal circuit device 300 via electric wire L for being processed to generate and accumulate data at certain preset intervals for further transmission to the LCD display circuit 302 in order to display the related quantity of water flow thereon in accordance with following formula: quantity of water flow (Q)=cross sectional area (A) times flow velocity (V).

Figure 51:
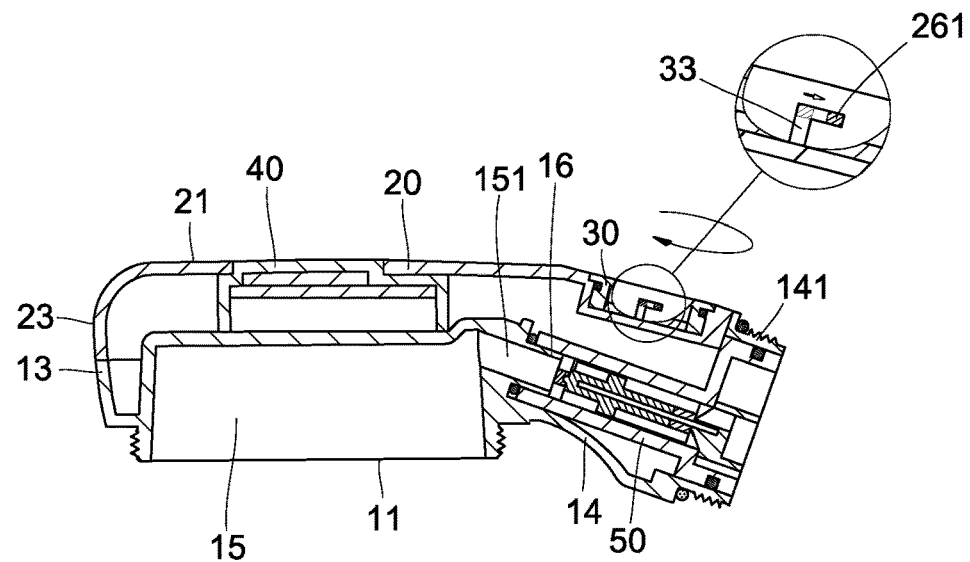
FIG. 51 is a first illustrative view showing inserting of a battery lid into a battery mount or showing detaching of a battery lid from the battery mount in the first exemplary embodiment of the present invention.
Figure 52:
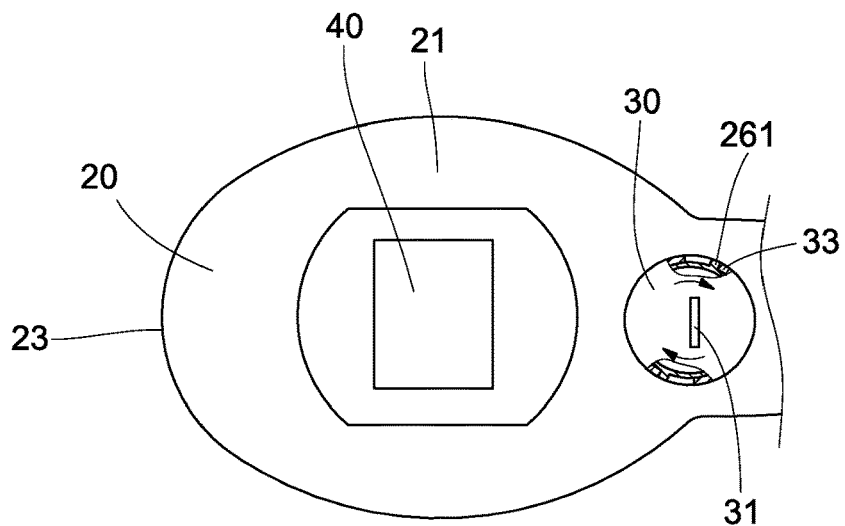
FIG. 52 is a second illustrative view showing inserting of the battery lid into a battery mount or showing detaching of the battery lid from the battery mount in the first exemplary embodiment of the present invention.

For replacing the button-shaped battery B, please further refer to FIGS. 49, 51 and 52. The power of the button-shaped battery B under the battery lid 30 may run out after several replacements of the handle filter cartridge 60. Once the power of the button-shaped battery B runs out, the battery lid 30 can be taken off battery mount 26 by simply inserting a coin into the rotatable notch 31 of the battery lid 30, and turning the battery lid 30 (as shown in FIG. 51) to let two snap notches 33 thereof detach from two projections 261 of the battery mount 26 in the showerhead upper shell 20 so that the integral battery lid 30 together with button-shaped battery B can be taken out of the battery mount 26 of the showerhead upper shell 20 (as shown in FIG. 49). A new button-shaped battery B can then be substituted for the depleted button-shaped battery B under the battery lid 30, and the previous steps reversely performed so that the new button-shaped battery B will supply power to the magnetic reed switch 304 and LCD display circuit 302 of the signal circuit device 300 as well as the microprocessor 301. Therefore, some drawbacks incurred by the redundant recharging procedures of the prior art handheld showerhead with filter replacing pre-alarm device, such as detaching the alerting pod 20 off the groove base 113 in the back side 102 of the showerhead shell 100 and reinserting the alerting pod 20 back to the groove base 113 in the back side 12 of the showerhead shell 100, can be eliminated by the first exemplary embodiment of the present invention.

The water flow measuring unit 50 and impeller shaft 500 are disposed in the lower handle filter cartridge mounting section 14 of the showerhead lower shell 10 while the battery mount 26 and button-shaped battery B are disposed in the upper handle filter cartridge mounting section 24 of the showerhead upper shell 20, wherein both the lower handle filter cartridge mounting section of handle 14 and the upper handle filter cartridge mounting section of handle 24 abut the handle filter cartridge 60 such that the overall weight distribution of the showerhead is more even than that of the prior art handheld showerhead with filter replacing pre-alarm device. Accordingly, the problem of uneven top-heavy weight distribution and the resulting harmful effects incurred in the prior art handheld showerhead with filter replacing pre-alarm device are all eliminated.

Figure 59:
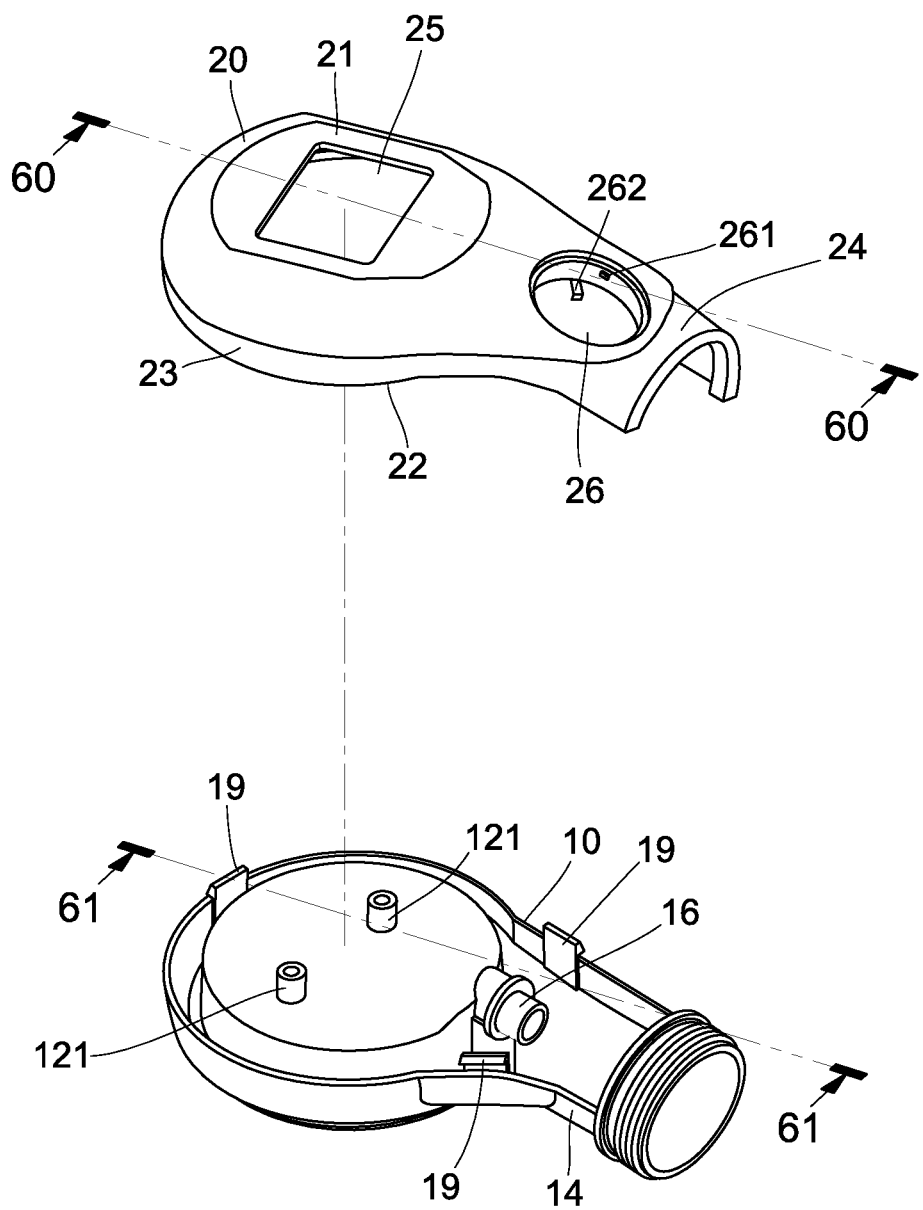
FIG. 59 is an exploded perspective view of a modified showerhead lower shell and modified showerhead upper shell with integrated latches for joining the upper and lower shells according to a second exemplary embodiment of the present invention.
Figure 60:
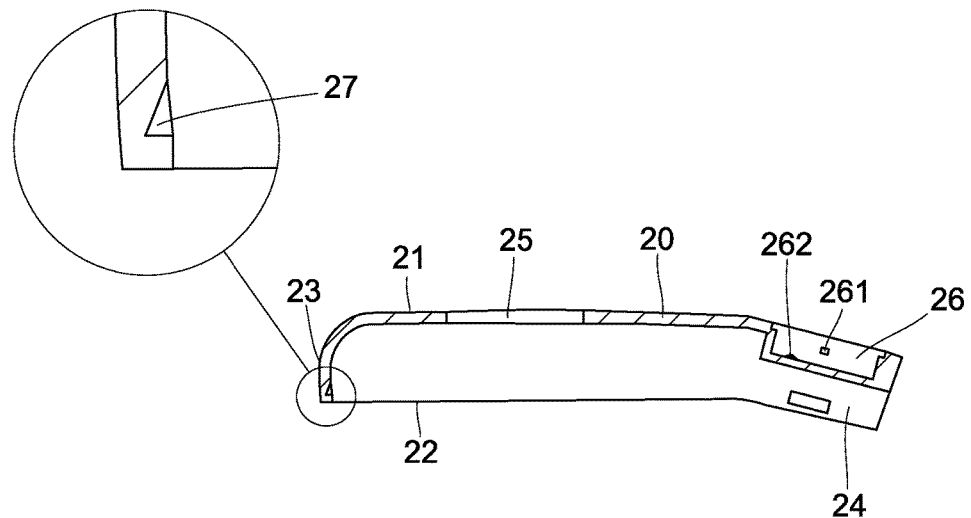
FIG. 60 is a cross sectional view taken against the section line 60-60 from previous FIG. 59.
Figure 61:
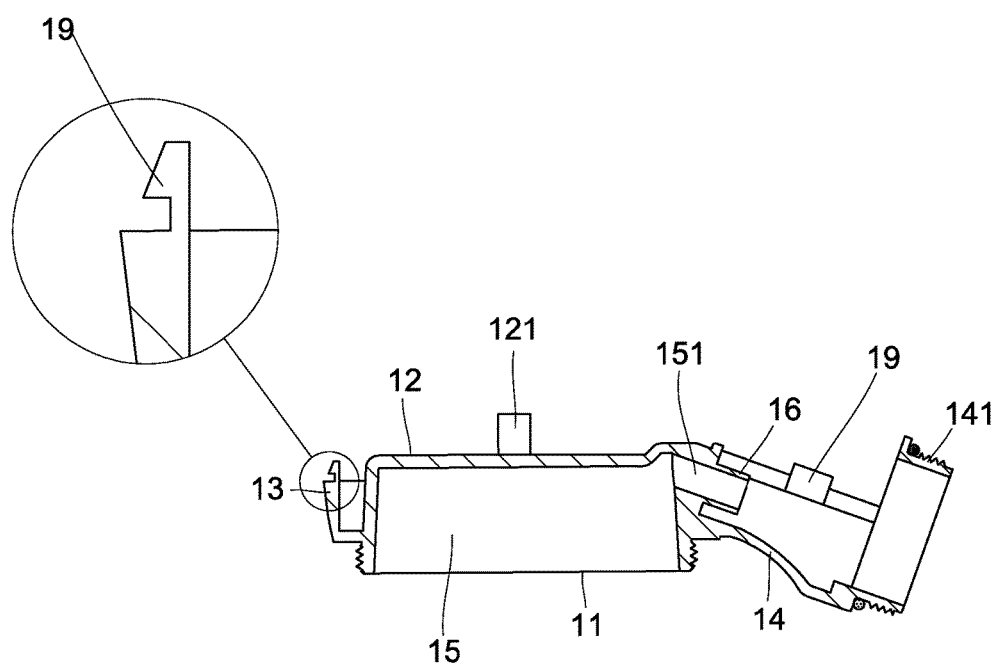
FIG. 61 is a cross sectional view taken against the section line 61-61 from previous FIG. 59.
Figure 62:
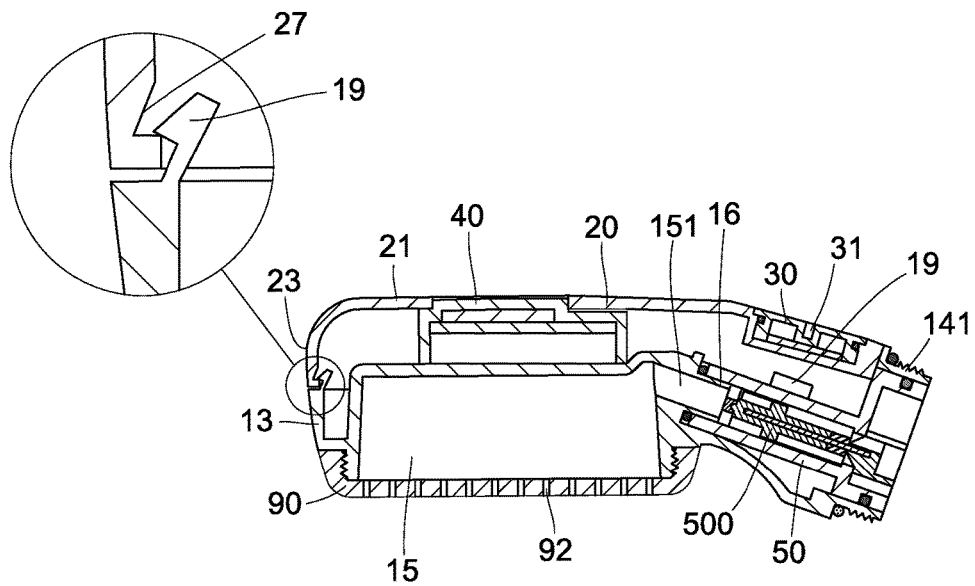
FIG. 62 is a first illustrative view showing assembly of the modified showerhead lower shell and modified showerhead upper shell in the second exemplary embodiment of the present invention.
Figure 63:
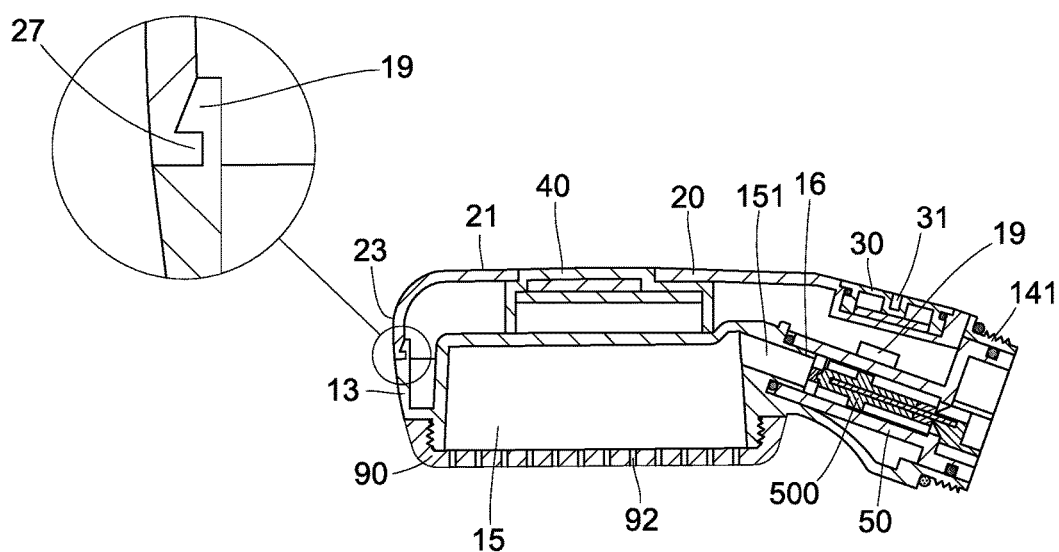
FIG. 63 is second illustrative view showing assembly of the modified showerhead lower shell and modified showerhead upper shell in the second exemplary embodiment of the present invention.

Please refer to FIGS. 59 through 63, which show a modified showerhead lower shell and modified showerhead upper shell that are joined by integrated latches in accordance with a second exemplary embodiment of the present invention. A plurality of upwardly elastic extending hooked latching arms 19 are further disposed in the shelf 13 of the modified showerhead lower shell 10 (as shown in FIGS. 59 and 61) while a plurality of corresponding latching notches 27 are also further disposed in the shelf 23 of the modified showerhead upper shell 20 (as shown in FIG. 60) so that both the modified showerhead lower shell 10 and modified showerhead upper shell 20 can be securely joined together by latching means of the upwardly extending elastic latching arms 19 and corresponding latching notches 27, instead of the high-frequency fusing method adopted in the first exemplary embodiment of the present invention.

Figure 65:
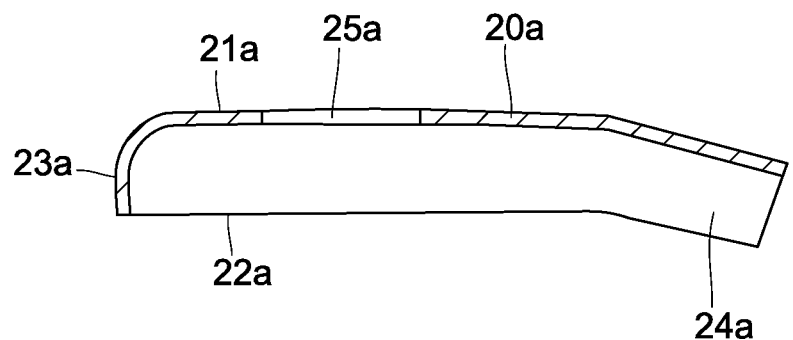
FIG. 65 is a cross sectional view for the modified showerhead upper shell in the third exemplary embodiment of the present invention.
Figure 64:
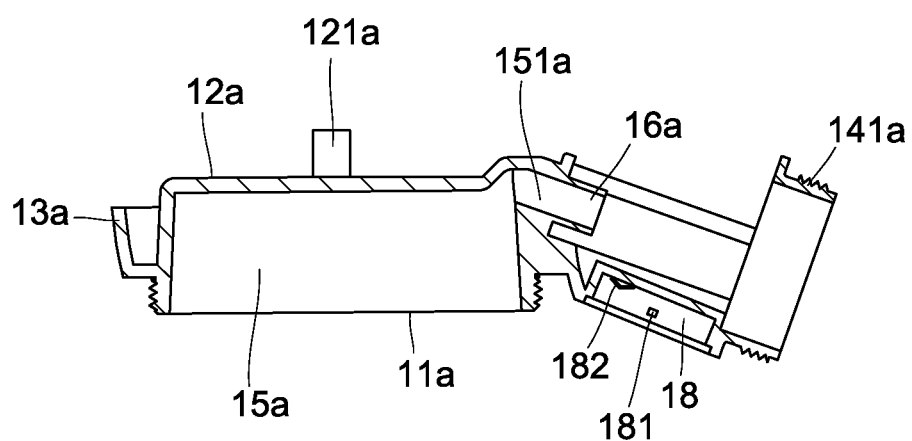
FIG. 64 is a cross sectional view a modified showerhead lower shell according to a third exemplary embodiment of the present invention.

Please refer to FIGS. 64 through 68, which show a modified showerhead lower shell and modified showerhead upper shell according to a third exemplary embodiment of the present invention. FIG. 64 shows the modified showerhead lower shell 10a while FIG. 65 shows the modified showerhead upper shell 20a of the third exemplary embodiment of the present invention.

The modified showerhead lower shell 10a, which is a plastic hollow casing extruded into a unitary piece, includes a shelf 13a having a front side 11a and a reverse side 12a and formed as an integral body such that the shelf 13a has an extending lower handle filter cartridge mounting section 14a that includes an externally threaded mounting cylinder 141a with a set of male threads that extend from a distal end of the lower shell 10a towards the handle of the showerhead for securely joining with the handle filter cartridge 60. The front side 11a has an internal water inlet groove 15a and a water inlet channel 151a that extends through a distal end of tubular adapter 16a towards the lower handle filter cartridge mounting section 14a, and a set of male threads 17a formed on an outer periphery of the front side 11a of shelf 13a for mating with the corresponding spray hood 90. The reverse side 12a has two raised cylinders with internal female threads 121a extending from a top surface thereof, and a battery mount 18 with two projections 181 and an electrical battery contact 182 that extend inwardly into the lower handle filter mounting section 14a near the distal externally-threaded cylinder 141a such that the projections 181 are outwardly formed on the internal vertical wall and the electrical battery contact 182 is outwardly formed at the internal bottom of the battery mount 18 (as shown in FIG. 64).

The modified showerhead upper shell 20a, which is a plastic casing extruded into a unitary piece for suitably covering the back side 12a of the modified showerhead lower shell 10a, includes a shelf 23a having a front side 21a and a reverse side 22a and formed as an integral body, wherein the shelf 23a has a modified upper handle filter cartridge mounting section 24a that extends towards the handle of the showerhead such that the profiles and sizes of the shelf 23a and a modified upper handle filter cartridge mounting section 24a are the same as those of the corresponding shelf 13a and modified lower handle filter cartridge mounting section 14a in the modified showerhead lower shell 10a, and on the top surface of the front side 21a, a viewing window 25a is created over the rear side thereof near the upper handle filter cartridge mounting section of handle 24a (as shown in FIG. 65).

Figure 66:
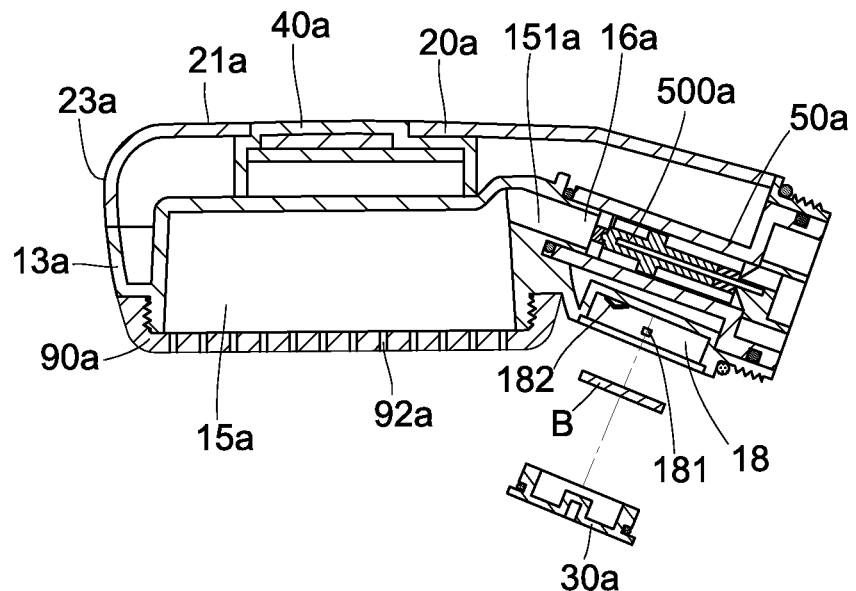
FIG. 66 is first assembly illustrative view the modified showerhead lower shell and modified showerhead upper shell in the third exemplary embodiment of the present invention.
Figure 67:
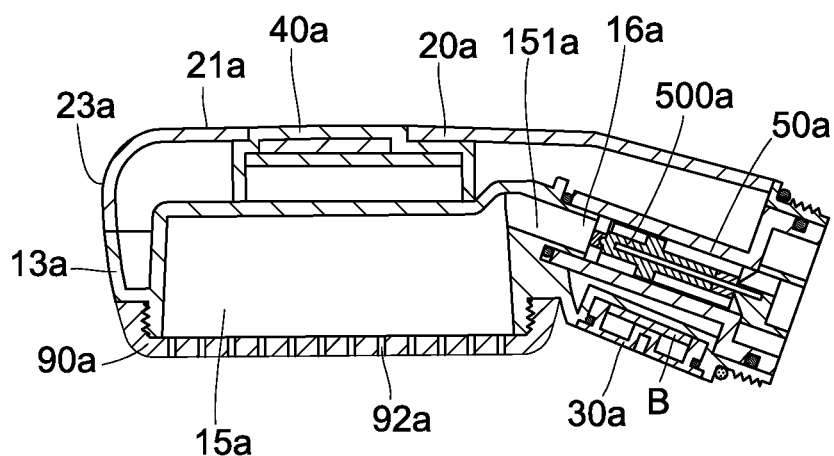
FIG. 67 is second illustrative view showing assembly of the modified showerhead lower shell and modified showerhead upper shell in the third exemplary embodiment of the present invention.
Figure 68:
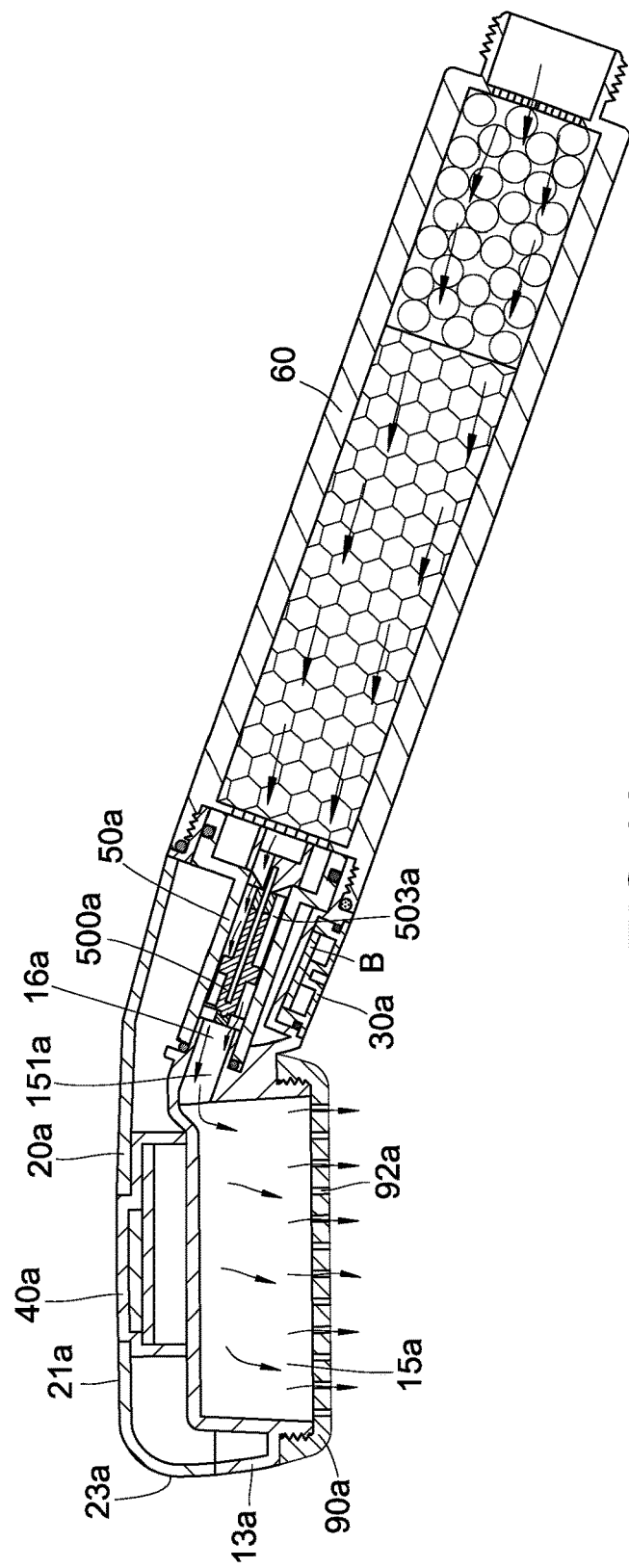
FIG. 68 is a cross sectional view showing assembly of the handle filter cartridge with the modified and joined together showerhead lower shell and showerhead upper shell in the third exemplary embodiment of the present invention.

The battery mount 18 in the lower handle filter cartridge mounting section 14a of the adapted showerhead lower shell 10a, which accommodates the battery lid 30 with associated button-shaped battery B (as shown in FIGS. 66 and 67), has the same function as battery mount 26 of the first exemplary embodiment of the present invention (as shown in FIG. 68).

The handheld showerheads of the above-described preferred embodiments have advantages of tremendously reducing molds required in the manufacturing process and labor-hours in the assembly procedure, and of solving issues of top-heavy awkwardness, accelerated aging fatigue and unnecessary purchase waste that occur in the prior art handheld showerhead with filter replacing pre-alarm device disclosed in R.O.C. Patent Published No. 201406337 and US Patent Publication No. 2014/0042240.

What is claimed is:

1. A hand-held showerhead capable of measuring and suggesting replacement of a filtering core handle, comprising:
    a lower shell and an upper shell arranged to be joined together to form a shell of the showerhead;
    a handle including a handle filter cartridge arranged to be mounted on the joined-together shell;
    an impeller arranged to rotate in response to passage of water through a water channel from the handle filter cartridge into the showerhead;
    a water flow measuring unit for measuring water flow by detecting rotation of the impeller;
    a display that displays an indication that the handle filter cartridge needs to be replaced; and
    a battery mount for mounting at least one battery that supplies electricity to the water flow measuring unit,
    wherein the water flow measuring unit and impeller are disposed in the lower shell while the battery mount is disposed in the upper shell, and both the lower shell and the upper shell abut the handle filter cartridge to provide even overall weight distribution of the showerhead,
    wherein the lower shell includes a lower shelf having a front side, a reverse side, and a threaded cylindrical handle filter cartridge mounting section, the front side having an internal water inlet groove in communication with said water channel, and the front side further including a threaded rim for securing a spray hood having openings for enabling water in the internal water inlet groove to jet out of the showerhead, and
    wherein the upper shell has a front side and a reverse side, a viewing window on the reverse side through which the display is visible, and a handle filter cartridge mounting section, the battery mount being located next to the handle filter cartridge mounting section of the upper shell.

2. A hand-held shower head capable of measuring and suggesting replacement of a filtering core handle as claimed in claim 1, further including a battery lid, wherein the battery mount includes two inwardly extending projections that engage a surface of the battery lid to prevent removal of the battery lid from the battery mount, and wherein rotation of the battery lid aligns the projections with opposed snap notches in the battery lid to enable removal of the battery lid from the battery mount, exposing a battery cavity including electrical contacts for electrically contacting terminals of the at least one battery when the at least one battery is situated in the battery compartment.

3. A hand-held shower head capable of measuring and suggesting replacement of a filtering core handle as claimed in claim 2, further comprising a rotating notch in a top surface of the battery lid for receiving an object to enable rotation of the battery lid and replacement of a battery situated in the battery mount.

4. A hand-held shower head capable of measuring and suggesting replacement of a filtering core handle as claimed in claim 3, wherein the at least one battery is a button-type battery.

5. A hand-held shower head capable of measuring and suggesting replacement of a filtering core handle as claimed in claim 1,
    wherein the measuring unit includes an upper section of an upper hollow column and a lower section of a base hollow column, and the water channel runs through both the base hollow column and upper hollow column,
    wherein the base hollow column has a sealing ring inlaid into the circumference thereof, and the upper hollow column is flanked by a hollow pillar with a tubular opening accommodating a magnetic reed switch or Hall effect device,
    wherein the impeller is inserted into the water channel and a magnetic element is included within a receptacle of the impeller, the magnetic reed switch or Hall effect device supplying electrical signals to the water flow measuring unit in response to movement of the magnetic element as the impeller rotates in response to water flowing through the water channel.

6. A hand-held shower head capable of measuring and suggesting replacement of a filtering core handle as claimed in claim 1, further including a signal circuit device accommodated in a holding cavity of the upper shell under a transparent cover, said display being visible through said transparent cover.

7. A hand-held shower head capable of measuring and suggesting replacement of a filtering core handle as claimed in claim 6, wherein the signal circuit device includes a microprocessor and an LCD display circuit.

8. A hand-held shower head capable of measuring and suggesting replacement of a filtering core handle as claimed in claim 1, wherein the water flow measuring unit is secured to the lower shell by inserting the water flow measuring unit into a distal joint cylinder with external male threads extending from the lower shelf and screwing the handle filter cartridge onto the external male threads of the distal joint cylinder.

9. A hand-held shower head capable of measuring and suggesting replacement of a filtering core handle as claimed in claim 1, wherein the lower shell and upper shell are extruded plastic pieces joined by ultrasonic fusing.

10. A hand-held shower head capable of measuring and suggesting replacement of a filtering core handle as claimed in claim 1, further comprising hooked arms extending from one of the lower shell and the upper shell, and corresponding notches in the other of the lower shell and the upper shell for securing the lower shell to the upper shell.

11. A hand-held shower head capable of measuring and suggesting replacement of a filtering core handle as claimed in claim 1, wherein the impeller includes an impeller shaft, which is inserted into the water channel in the water flow measuring unit, a bottom central bushing, an upper axial docking projection, a plurality of circumferential spiral vanes, and a bottom round gapped receptacle encompassed by the bottom ends of the spiral vanes, and wherein an inducting magnet whose rotation is detected by the water flow measuring unit is placed in the bottom round gapped receptacle of the impeller shaft.

12. A hand-held shower head capable of measuring and suggesting replacement of a filtering core handle, comprising:
   a lower shell and an upper shell arranged to be joined together to form a shell of the showerhead;
   a handle including a handle filter cartridge arranged to be mounted on the joined-together shell;
   an impeller arranged to rotate in response to passage of water through a water channel from the handle filter cartridge into the showerhead;
   a water flow measuring unit for measuring water flow by detecting rotation of the impeller;
   a display that displays an indication that the handle filter cartridge needs to be replaced; and
   a battery mount for mounting at least one battery that supplies electricity to the water flow measuring unit,
   wherein the water flow measuring unit and impeller are disposed in the lower shell while the battery mount is disposed in the upper shell, and both the lower shell and the upper shell abut the handle filter cartridge to provide even overall weight distribution of the showerhead, and
   further comprising a supporter that includes a supporting tripod with radial ribs and a supporting base located at an upstream end of the water channel within a handle filter cartridge mounting section of the lower shell, wherein the radial ribs form a bushing for rotatably supporting a shaft of the impeller while permitting passage of water past the impeller.

13. A hand-held shower head capable of measuring and suggesting replacement of a filtering core handle as claimed in claim 12, wherein the water channel includes a plurality of blocking vanes radially disposed in an upper portion thereof to form a second bushing that embraces a central suspended body composed of an upper baffle and a lower docking notch for receiving and rotatably supporting downstream end of the impeller.

14. A hand-held showerhead capable of measuring and suggesting replacement of a filtering core handle, comprising:
   a lower shell and an upper shell arranged to be joined together to form a shell of the showerhead;
   a handle including a handle filter cartridge arranged to be mounted on the joined-together shell;
   an impeller arranged to rotate in response to passage of water through a water channel from the handle filter cartridge into the showerhead;
   a water flow measuring unit for measuring water flow by detecting rotation of the impeller;
   a display that displays an indication that the handle filter cartridge needs to be replaced; and
   a battery mount and battery lid for mounting at least one battery that supplies electricity to the water flow measuring unit,
   wherein the battery mount includes two inwardly extending projections that engage a surface of the battery lid to prevent removal of the battery lid from the battery mount, and wherein rotation of the battery lid aligns the projections with opposed snap notches in the lid to enable removal of the battery lid from the battery mount, exposing a battery cavity including electrical contacts for electrically contacting terminals of the at least one battery when the at least one battery is situated in the battery compartment, and
   wherein the battery mount further comprises a rotating notch in a top surface of the battery lid for receiving an object to enable rotation of the battery lid and replacement of a battery situated in the battery mount,
   wherein the measuring unit includes an upper section of an upper hollow column and a lower section of a base hollow column, and the water channel runs through both the base hollow column and upper hollow column,
   wherein the base hollow column has a sealing ring inlaid into the circumference thereof, and the upper hollow column is flanked by a hollow pillar with a tubular opening accommodating a magnetic reed switch or Hall effect device, and
   wherein the impeller shaft is inserted into the water channel and a magnetic element is included within a receptacle of the impeller shaft, the magnetic reed switch or Hall effect device supplying electrical signals to the water flow measuring unit in response to movement of the magnetic element as the impeller shaft rotates in response to water flowing through the water channel.

15. A hand-held shower head capable of measuring and suggesting replacement of a filtering core handle as claimed in claim 14, wherein the at least one battery is a button-type battery.

16. A hand-held shower head capable of measuring and suggesting replacement of a filtering core handle as claimed in claim 14, further including a signal circuit device accommodated in a holding cavity of the upper shell under a transparent cover, said display being visible through said transparent cover.

17. A hand-held shower head capable of measuring and suggesting replacement of a filtering core handle as claimed in claim 16, wherein the signal circuit device includes a microprocessor and an LCD display circuit.

18. A hand-held shower head capable of measuring and suggesting replacement of a filtering core handle, comprising:
   a lower shell and an upper shell arranged to be joined together to form a shell of the showerhead;
   a handle including a handle filter cartridge arranged to be mounted on the joined-together shell;
   an impeller arranged to rotate in response to passage of water through a water channel from the handle filter cartridge into the showerhead;
   a water flow measuring unit for measuring water flow by detecting rotation of the impeller;
   a display that displays an indication that the handle filter cartridge needs to be replaced; and
   a battery mount and battery lid for mounting at least one battery that supplies electricity to the water flow measuring unit,
   wherein the battery mount includes two inwardly extending projections that engage a surface of the battery lid to prevent removal of the battery lid from the battery mount, and wherein rotation of the battery lid aligns the projections with opposed snap notches in the lid to enable removal of the battery lid from the battery mount, exposing a battery cavity including electrical contacts for electrically contacting terminals of the at least one battery when the at least one battery is situated in the battery compartment, wherein the battery mount further comprises a rotating notch in a top surface of the battery lid for receiving an object to enable rotation of the battery lid and replacement of a battery situated in the battery mount, wherein the lower shell includes a lower shelf having a front side, a reverse side, and a threaded cylindrical handle filter cartridge mounting section, the front side having an internal water inlet groove in communication with said water channel, and the front side further including a threaded rim for securing a spray hood having openings for enabling water in the internal water inlet groove to jet out of the showerhead, and wherein the upper shell has a front side and a reverse side, a viewing window on the reverse side through which the display is visible, and a handle filter cartridge mounting section.

\* \* \* \* \*